(12) United States Patent
Ichijo et al.

(10) Patent No.: US 7,010,404 B2
(45) Date of Patent: Mar. 7, 2006

(54) POSITION CONTROL APPARATUS AND POSITION CONTROL METHOD FOR CARGO CARRYING APPARATUS IN INDUSTRIAL VEHICLE

(75) Inventors: Hisashi Ichijo, Kariya (JP); Kenichi Katae, Kariya (JP); Torahiko Yamanouchi, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/470,129

(22) PCT Filed: Feb. 18, 2002

(86) PCT No.: PCT/JP02/01354

§ 371 (c)(1),
(2), (4) Date: Jul. 25, 2003

(87) PCT Pub. No.: WO03/062127

PCT Pub. Date: Jul. 31, 2003

(65) Prior Publication Data

US 2004/0073359 A1    Apr. 15, 2004

(30) Foreign Application Priority Data

Jan. 23, 2002 (JP) .............................. 2002-014735
Jan. 23, 2002 (JP) .............................. 2002-014736

(51) Int. Cl.
  *G06F 17/00* (2006.01)
  *B66F 9/24* (2006.01)

(52) U.S. Cl. ...................... 701/50; 701/23; 701/28; 382/103

(58) Field of Classification Search ................. 701/50, 701/23, 28, 41, 201, 211; 187/222, 207, 187/218, 227; 382/103, 105; 180/169, 209; 414/462, 467
See application file for complete search history.

(56) References Cited

U.S. PATENT DOCUMENTS

| | | | |
|---|---|---|---|
| 4,279,328 A | 7/1981 | Ahlbom | 187/9 R |
| 4,678,329 A * | 7/1987 | Lukowski et al. | 356/152.2 |
| 5,208,753 A | 5/1993 | Acuff | 364/424.07 |
| 5,586,620 A | 12/1996 | Dammeyer et al. | 187/227 |
| 5,738,187 A * | 4/1998 | Dammeyer et al. | 187/222 |
| 5,812,395 A * | 9/1998 | Masciangelo et al. | 700/56 |
| 5,897,286 A * | 4/1999 | Whittaker | 414/607 |
| 2003/0044047 A1 * | 3/2003 | Kelly et al. | 382/104 |

FOREIGN PATENT DOCUMENTS

| | | |
|---|---|---|
| JP | 54-144658 | 11/1979 |
| JP | 5-54496 | 7/1993 |

(Continued)

*Primary Examiner*—Tan Q. Nguyen
(74) *Attorney, Agent, or Firm*—Morgan & Finnegan, LLP

(57) ABSTRACT

A camera 19 picks up an image of a cargo handling target and acquires image data of a mark affixed to the cargo handling target. An image processing section 66 performs image recognition of the mark and acquires the position and size of the mark in a screen coordinate system. A real coordinate position calculating section 77 acquires the position of the camera 19 in a real coordinate system based on the obtained position and size of the mark. Based on the position of the camera 19, a deviation amount calculating section 78 acquires a deviation amount between the current position of forks and a target position. A cargo handling control section 50 executes automatic positioning control of the forks in such a way that the deviation amount becomes zero.

35 Claims, 15 Drawing Sheets

FOREIGN PATENT DOCUMENTS

| | | |
|---|---|---|
| JP | 6-135698 | 5/1994 |
| JP | 6-239410 | 8/1994 |
| JP | 8-322121 | 12/1996 |
| JP | 11-278799 | 10/1999 |

* cited by examiner

Double Location Matching

Screen Coordinate System

Real Coordinate System

Camera (Xc, Yc, Zc)

POSITION CONTROL APPARATUS AND POSITION CONTROL METHOD FOR CARGO CARRYING APPARATUS IN INDUSTRIAL VEHICLE

BACKGROUND OF THE INVENTION

The present invention relates to a position control apparatus and position control method for a cargo carrying apparatus on an industrial vehicle, and, more particularly, to a technique for automatically positioning a cargo carrying apparatus on an industrial vehicle with respect to a cargo handling target based on image data obtained by picking up an image of the cargo handling target.

A forklift, one type of industrial vehicles, has a multi-level mast, a carriage liftable up and down along the mast, and a cargo carrying apparatus attached to the carriage, or forks. In general, in case where a cargo carrying work is performed with a forklift, a load is placed on a pallet and the load-deposited pallet is carried by the forks. In case of taking out a pallet on a rack at a high place (e.g., 3 to 6 meters) or in case of placing a pallet on that rack, a driver operates a lift lever to lift the forks up along the mast and protract the mast. Then, the positions of the forks are adjusted in such a way that the forks are positioned with respect to the pallet or the rack as a cargo handling target.

At this time, the driver must operate the lift lever in such a way as to adjust the positions of the forks while looking up at the high place. However, such a positioning work is difficult and even a skilled person needs time for the work.

U.S. Pat. No. 5,586,620 discloses an apparatus for aiding a work of positioning forks at a high place. In this apparatus, a camera is mounted to a carriage for supporting the forks and a video image picked up by the camera is shown to a driver in a driver's seat via a display device. Because the driver can see the situation in front of the forks through the display device, the driver can do a fork positioning work at a high place relatively easily and accurately.

However, the apparatus merely performs visual aiding. Specifically, the apparatus merely uses a camera for picking up an image of an area at a high place, which is difficult to see from the driver's seat, and shows the image to the driver. The driver needs to do a work of positioning the forks with respect to a cargo handling target through a manual operation and a considerable burden of the cargo carrying work is still imposed on the driver.

BRIEF SUMMARY OF THE INVENTION

It is an object of the present invention to provide a position control apparatus and position control method for a cargo carrying apparatus on an industrial vehicle, which can lighten the burden of a cargo carrying work on a driver.

To achieve the object, the present invention provides a position control apparatus for a cargo carrying apparatus on an industrial vehicle, comprising a camera for picking up an image of a mark provided on a cargo handling target to acquire data of the image; image processing means for processing the image data and detecting a position of the mark; target position determining means for determining a target position to which the cargo carrying apparatus is to be shifted; deviation amount computing means for computing a deviation amount of a current position of the cargo carrying apparatus with respect to the target position based on a result of processing the image data by the image processing means; moving means for moving the cargo carrying apparatus; and control means for executing positioning control to position the cargo carrying apparatus with respect to the target position and causing the moving means to move the cargo carrying apparatus in such a way as to eliminate the deviation amount.

The present invention also provides a position control method for a cargo carrying apparatus on an industrial vehicle, comprising a step of picking up an image of a mark provided on a cargo handling target with a camera to acquire data of the image; a step of processing the image data and detecting a position of the mark; a step of determining a target position to which the cargo carrying apparatus is to be shifted; a step of computing a deviation amount of a current position of the cargo carrying apparatus with respect to the target position based on a result of processing the image data; and a step of moving the cargo carrying apparatus in such a way as to eliminate the deviation amount.

BRIEF DESCRIPTION OF THE DRAWINGS

FIG. 7($b$) is a schematic side view depicting forks after undergoing automatic horizontal control.

FIG. 8($b$) is a diagram showing a template T1 corresponding to the first mark M1 in FIG. 8($a$).

FIG. 8($c$) is a diagram showing a second mark M2 affixed to a rack.

FIG. 8($d$) is a diagram showing a template T2 corresponding to the second mark M2 in FIG. 8($c$).

FIG. 10($b$) is a diagram for explaining a real coordinate system.

FIG. 11($b$) is a plan view for explaining the real coordinate system.

FIG. 13($b$) is a diagram showing a screen after fork positioning in load pickup mode.

FIG. 14($b$) is a diagram showing a screen after fork positioning in load deposition mode.

DETAILED DESCRIPTION OF THE PREFERRED EMBODIMENTS

The first embodiment embodying the present invention will be described below with reference to FIGS. 1 to 14(b).

Figure 1:
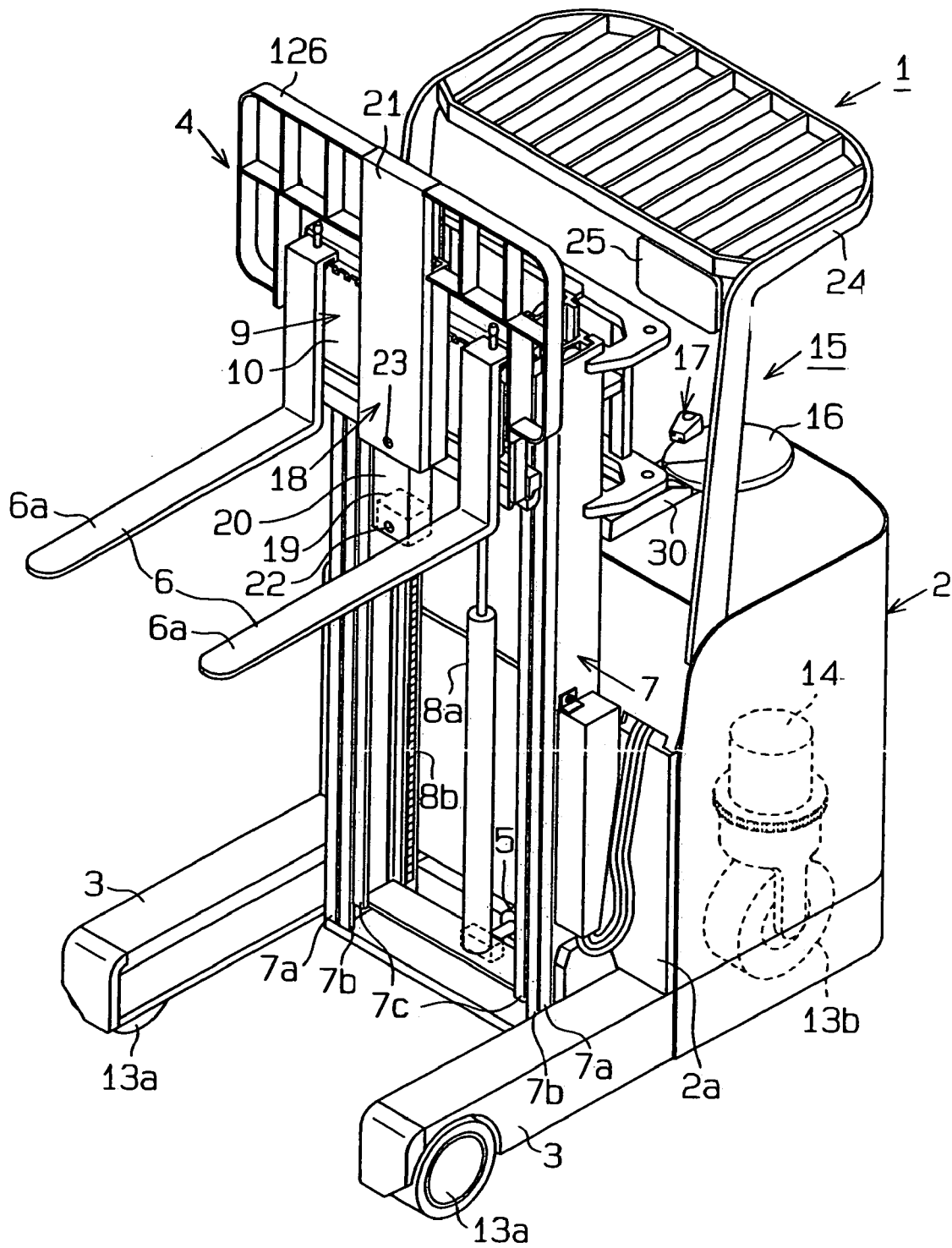
FIG. 1 is a perspective view of a forklift according to a first embodiment of the present invention.

FIG. 1 is a perspective view of a reach type forklift truck 1, which is an industrial vehicle. Hereinafter, it is simply written as "forklift 1". As shown in FIG. 1, the forklift 1 has a vehicle body 2, a pair of right and left reach legs 3 extending frontward from the vehicle body 2, and a mast assembly 4 movable forward and backward of the vehicle body 2 along the reach legs 3. The movement of the mast assembly 4 along the reach legs 3 is called the reach operation of the mast assembly 4. A reach cylinder 5 is disposed on the vehicle body 2 and the reach cylinder 5 causes the mast assembly 4 to do the reach operation. The mast assembly 4 has forks 6 as a cargo carrying apparatus and the positions of the forks 6 are adjusted in the forward and backward directions of the vehicle body 2 in accordance with the reach operation of the mast assembly 4.

The mast assembly 4, which functions as a lifting unit, has a three-level mast 7 of a telescopic type (full free type), and a carriage 9, which supports the forks 6. The mast 7 comprises a pair of outer mast members 7a, a pair of middle mast members 7b and a pair of inner mast members 7c. The carriage 9 can move up and down along the inner mast members 7c, which are guide members or guide mast members. When the carriage 9 is lifted up, the mast 7 starts protracting after the carriage 9 reaches the topmost end of the inner mast members 7c.

A first lift cylinder 8a extending vertically in the center of the mast assembly 4 is attached to the bottom plate of the inner mast members 7c and causes the carriage 9 to be lifted up and down along the inner mast members 7c. A pair of second lift cylinders 8b (only one shown) is provided upright at the backs of the outer mast members 7a on both sides of the first lift cylinder 8a. When it is detected that the carriage 9 has been positioned at the topmost end of the inner mast members 7c, the mast 7 is retracted by both second lift cylinders 8b. When the mast 7 is protracted most, the inner mast members 7c are positioned at the topmost end of the mast 7.

When the carriage 9 is lifted up to the topmost end of the inner mast members 7c from the lowest lift-down position, therefore, the protraction of the mast 7 is not performed. At this time, the height of the forks 6 on the carriage 9 is, for example, 2 m. As the mast is protracted with the carriage 9 positioned at the topmost end of the inner mast members 7c, the carriage 9 is lifted up to a higher position. The height of the forks 6 positioned at the highest lift-up position is, for example, about 6 m.

The carriage 9 has a side shifter 10. A back rest 126 is attached to the upper portion of the side shifter 10. The side shifter 10 is moved leftward and rightward of the vehicle body 2, i.e., in the widthwise direction by a side shift cylinder 11 (see FIG. 5). The forks 6 detachably attached to the side shifter 10 move together with the side shifter 10. The forks 6 are one of plural types of attachments. An attachment to be attached to the side shifter 10 is selected in accordance with the type of the cargo carrying work. A tilt cylinder 12 (see FIG. 5) is connected to the carriage 9 and the tilt angle of the forks 6 is adjusted by the tilt cylinder 12. The cylinders 5, 8a, 8b, 11 and 12 are actuators to drive the mast assembly 4.

Front wheels 13a as driven wheels are attached to the distal end portions of the individual reach legs 3. Rear wheels 13b as driving wheels are attached to the rear portion of the vehicle body 2. The rear wheels 13b also serve as steered wheels. The rear wheels 13b are driven by the power from a drive motor 14, which is driven by a battery 2a installed in the vehicle body 2 as a power supply. A stand-up type driver's seat 15 is provided at the rear right portion of the vehicle body 2. As a steering wheel 16 of resin provided near the driver's seat 15 is operated, the rear wheels 13b are steered. A steering wheel knob 17, which is gripped by a driver at the time of operating the steering wheel 16, is provided on the top surface of the steering wheel 16.

A camera lifting unit 18 is assembled to the front center portion of the side shifter 10 in order to support the positioning operation for the forks 6 in a high position. The camera lifting unit 18 moves sideways together with the side shifter 10. The camera lifting unit 18 has a housing 21 attached to the side shifter 10 and a camera unit 20 supported by the housing 21. A CCD camera 19 is incorporated in the camera unit 20. The camera unit 20 is movable between a storage position in which it is stored in the housing 21 and an exposure position where it is exposed from the lower end of the housing 21.

Figure 2:
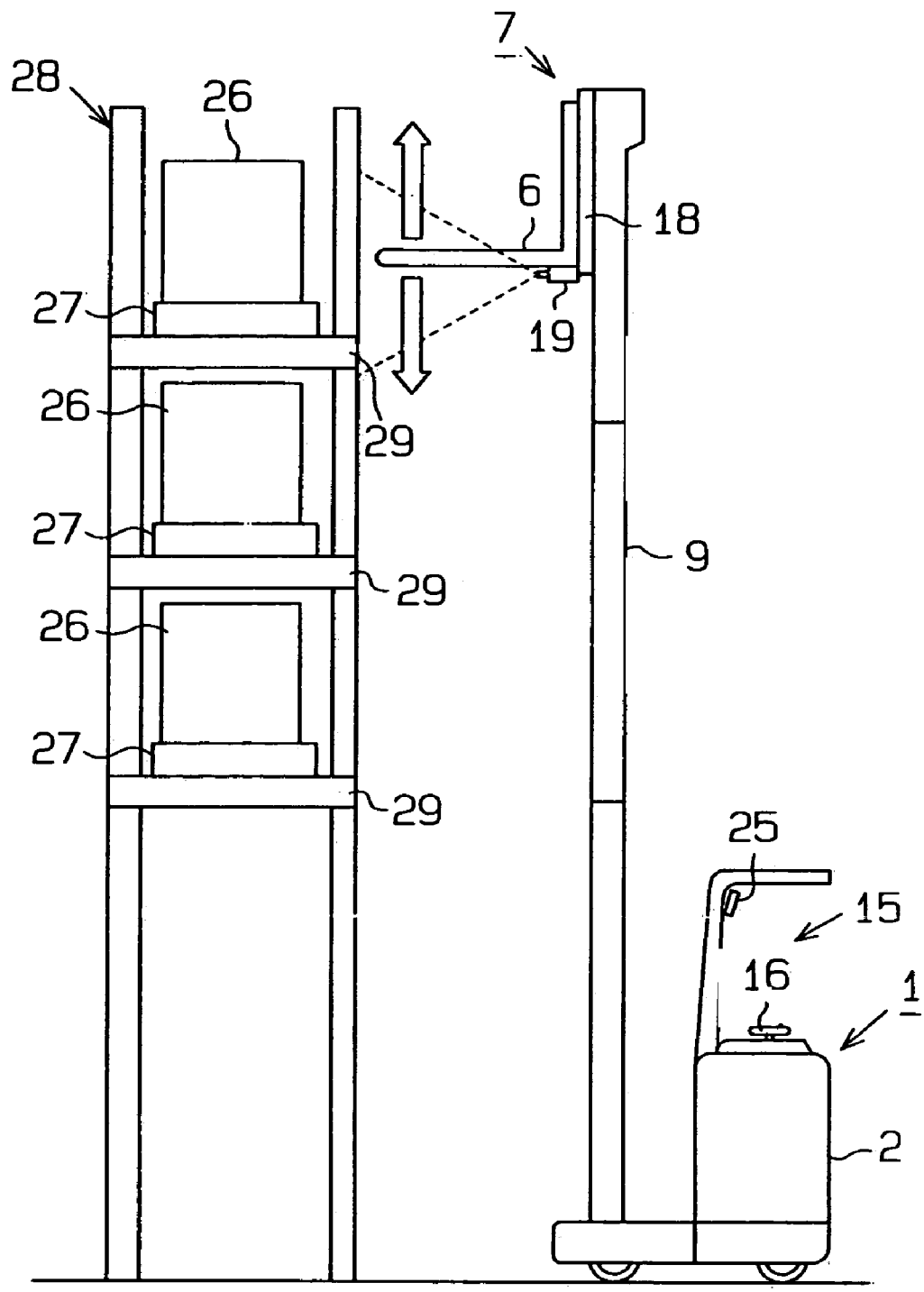
FIG. 2 is a schematic side view for explaining a cargo carrying work performed by the forklift in FIG. 1.

Cargo carrying works using the forks 6 include a load pickup work to take out a pallet 27 on which a load 26 is to be placed from a predetermined deposition place, such as a rack 28, and a load deposition work to place the pallet 27 on the forks 6 at the deposition place (see FIG. 2). With the forks 6 at a high place, the camera unit 20 is positioned in the storage position in load pickup mode and is positioned in the exposure position in load deposition mode.

The camera 19 picks up the image of a cargo carrying work area in front of the forks 6 via a lens 22. An image pickup window 23 is formed in the front lower portion of the housing 21. Even when the camera unit 20 is positioned in the storage position, the camera 19 can pick up the image of the cargo carrying work area through the image pickup window 23. That is, the front of the forks 6 can be picked up from two positions, the storage position and the exposure position. When the camera unit 20 is positioned in the storage position, the camera 19 is positioned at approximately the same level as the lower end of the forks 6 or slightly higher. When the camera unit 20 is positioned in the exposure position, on the other hand, the camera 19 is positioned below the lower end of the forks 6.

A liquid crystal display device 25 is attached to a roof 24, which covers the upper portion of the vehicle body 2, at a location where the driver standing on the driver's seat 15 can see well. The image of an area in front of the forks 6, which is picked up by the camera 19, is displayed on a screen 25a of the display device 25 (see FIG. 10(a)). The driver can do a cargo carrying work while viewing the screen 25a.

FIG. 2 shows the state when a cargo carrying work is carried out by the forklift 1. The cargo carrying work is carried out with loads 26 placed on pallets 27. The rack 28 where the loads 26 are to be placed has a multi-stage structure and has plural stages of shelf plates 29. The height of the rack 28 is considerably greater than the vehicle body 2 of the forklift 1. At the time a cargo carrying work is performed with respect to a shelf plate 29 at a high place, therefore, there may be a case where the driver cannot see the cargo carrying work from the driver's seat 15. To solve it, in this embodiment, the image of an area in front of the forks 6 is picked up by the camera 19 and the positioning of the forks 6 is automatically executed based on the picked-up image, thereby supporting the cargo carrying work.

Figure 3:
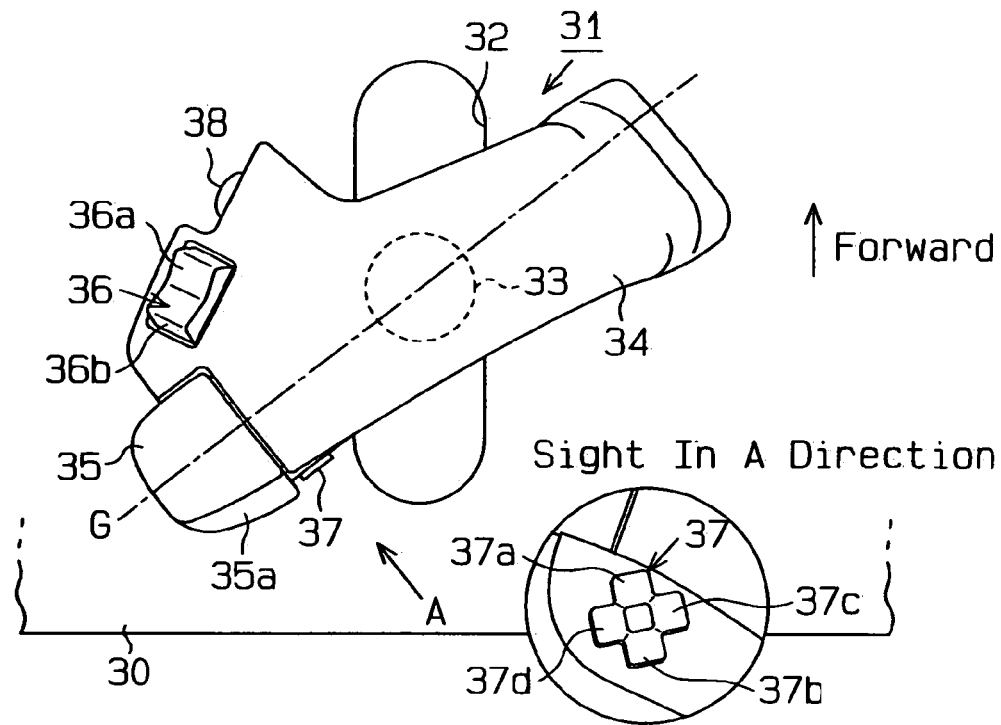
FIG. 3 is a plan view of a multi lever provided on the forklift in FIG. 1.

As shown in FIG. 3, a multi lever 31 is provided on an instrument panel 30 located on the front side of the driver's seat 15. The multi lever 31 can ensure both the driving work and cargo carrying work by itself, and has a plurality of operation sections. The multi lever 31 has a lever body 33, which tilts forward and backward of the vehicle body 2 along a slot 32 on the instrument panel 30. The lever body 33 is held in the neutral position, approximately perpendicular to the surface of the instrument panel 30, by a spring (not shown) in a non-operational state as shown in FIG. 3. Attached to the upper end portion of the lever body 33 is a grip 34 in a state where it is tilted by an angle of about 30 degrees to 60 degrees to the widthwise direction of the vehicle body 2.

A knob 35 approximately cylindrical in shape is provided at the left end portion of the grip 34 in such a way as to be rotatable about an axial line G. A seesaw switch 36 is provided at the front edge of the left-hand side portion of the grip 34, a cross switch 37 is provided at the back of the left-hand side portion of the grip 34, and an activation switch 38, which functions as operation means, is provided at the front side of the left-hand side portion of the grip 34. The cross switch 37 as seen from the direction of an arrow A is shown in a circle. The multi lever 31 is operated with a right hand, and the knob 35 or the cross switch 37 can be manipulated with a thumb while holding the grip 34 and the seesaw switch 36 or the activation switch 38 can be manipulated with an index finger.

Tilting the lever body 33 forward (upward in FIG. 3) with the right hand holding the grip 34 moves the forklift 1 forward and tilting the lever body 33 backward moves the forklift 1 backward. A projection 35a is formed on the knob 35. As the knob 35 is turned by pushing the projection 35a is upward with the thumb, the forks 6 are lifted upward, and as the knob 35 is turned by pushing the projection 35a downward with the thumb, the forks 6 are lifted downward. Pushing a front end 36a of the seesaw switch 36 with the index finger moves the mast assembly 4 forward, and pushing a rear end 36b of the seesaw switch 36 with the index finger moves the mast assembly 4 backward.

The cross switch 37 has four operation sections 37a to 37d. The tilting of the forks 6 is manipulated with the upper and lower operation sections 37a and 37b and the sideway movement of the forks 6 is manipulated with the right and left operation sections 37c and 37d. That is, pushing the upper operation section 37a with the thumb tilts the forks 6 forward and pushing the lower operation section 37b tilts the forks 6 rearward. Further, pushing the right operation section 37c with the thumb shifts the forks 6 rightward of the vehicle body 2 and pushing the left operation section 37d shifts the forks 6 leftward of the vehicle body 2. In a cargo carrying work, after the forks 6 are roughly positioned to a desired cargo handling target (pallet 27 or shelf plate 29) by manipulating the multi lever 31, automatic positioning control of the forks 6 is started by operating the activation switch 38.

Figure 5:
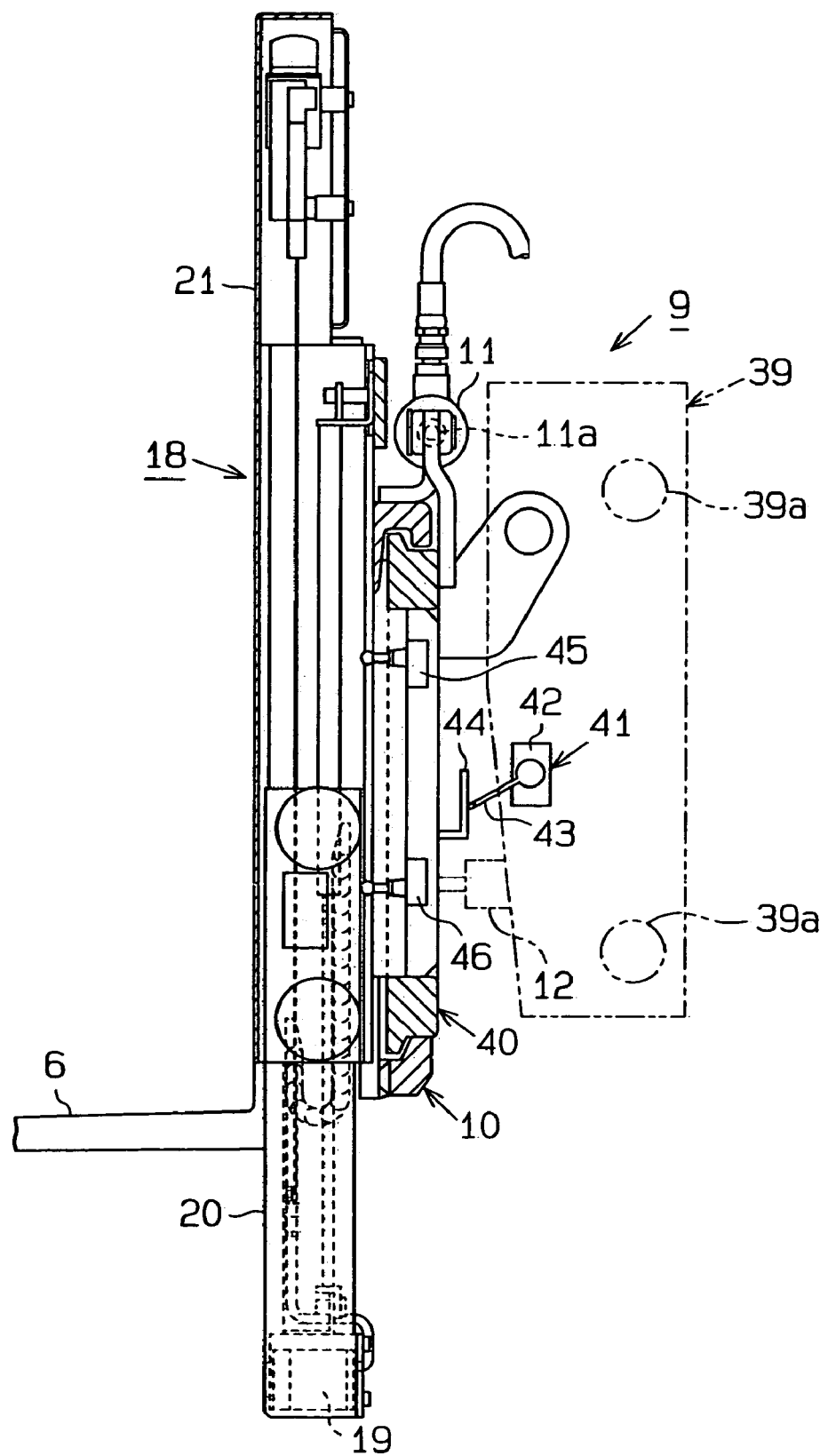
FIG. 5 is a side cross-sectional view showing a carriage on the forklift in FIG. 1.

FIG. 5 is a side cross-sectional view showing the carriage 9. The carriage 9 has a lift bracket 39 suspended by a chain (not shown). Two rollers 39a are provided on either side of the lift bracket 39 and those rollers 39a are rollable along the inner surfaces of the inner mast members 7c. The chain that supports the lift bracket 39 in a suspended fashion is put around a sprocket provided at the upper end portion of the rod of the first lift cylinder 8a (see FIG. 1). As the first lift cylinder 8a is driven, the entire carriage 9 including the lift bracket 39 is lifted up and down along the inner mast members 7c.

A finger bar 40 is arranged in front of the lift bracket 39 and is supported, tiltable forward and backward, on the lift bracket 39. The side shifter 10 is attached to the finger bar 40 in such a manner as to be movable sideways (the direction perpendicular to the sheet of FIG. 5).

The side shift cylinder 11 is attached to the upper portion of the finger bar 40 and has a piston rod 11a coupled to the side shifter 10. The side shift cylinder 11 shifts the side shifter 10 sideways with respect to the finger bar 40. The tilt cylinder 12 couples the finger bar 40 to the lift bracket 39. The tilt cylinder 12 that functions as a tilt actuator tilts the finger bar 40 with respect to the lift bracket 39. The side shifter 10 and the forks 6 are tilted together with the finger bar 40.

A tilt angle sensor 41 comprised of, for example, a potentiometer, is attached to the lift bracket 39. The tilt angle sensor 41 has a body 42 and a lever 43 rotatable with respect to the body 42, and the distal end of the lever 43 abuts on an abutment portion 44 provided on the finger bar 40. As the finger bar 40 tilts, the lever 43 turns. Something other than the potentiometer may be used for the tilt angle sensor 41. The tilt angle sensor 41 outputs a signal according to the rotational angle of the lever 43, i.e., the tilt angle of the forks 6. The finger bar 40 is provided with an upper-limit position detection switch 45, which detects the upper-limit position of the camera 19, and a lower-limit position detection switch 46, which detects the lower-limit position of the camera 19.

Figure 4:
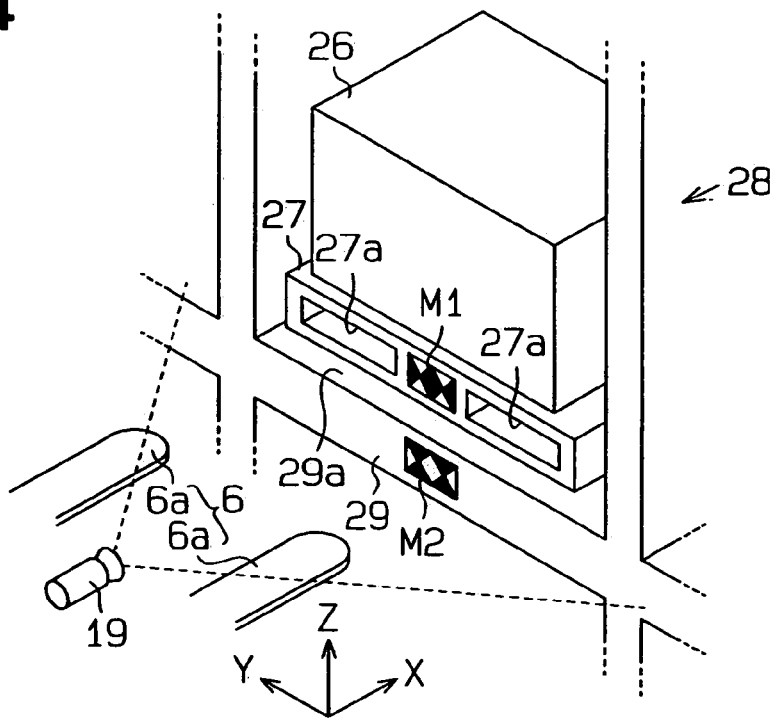
FIG. 4 is a perspective view for explaining automatic positioning control for forks.

Next, automatic positioning control on the forks 6 will be described according to FIG. 4. The pallets 27 and the rack 28 are affixed with marks M1 and M2, which become reference points at the time of positioning the forks 6. Specifically, the pallet 27 has two insertion holes 27a in which the forks 6 are to be inserted. The first mark M1 is affixed to the center portion of one side of the pallet 27 so as to be positioned between both insertion holes 27a. A similar first mark M1 may be affixed to the opposite side to the side where the first mark M1 shown in FIG. 4 is affixed. The second mark M2 is affixed to the front side of the shelf plate 29 in such a way as to correspond to the center portion of each storage space of the rack 28. The shape of the first mark M1 affixed to the pallet 27 is identical to the shape of the second mark M2 affixed to the rack 28. However, both marks M1 and M2 have black and white patterns inverted to each other. Automatic positioning control on the forks 6 is carried out with those marks M1 and M2 as the reference points.

In case of doing a load pickup work, the operation mode of the forklift 1 is switched to the load pickup mode. In load pickup mode, the forks 6 are automatically positioned, targeting the first mark M1 affixed on the pallet 27 itself, in such a way as to face both insertion holes 27a of the pallet 27. In case of doing a load deposition work, the operation mode of the forklift 1 is switched to the load deposition mode. In load deposition mode, the forks 6 are automatically positioned to a shelf surface (deposition surface) 29a of the shelf plate 29 with the second mark M2 affixed on the rack 28 as a reference point. At this time, the forks 6 are positioned at a position higher by a predetermined distance (for example, 10 to 20 cm) than the shelf surface 29a and the positions of the forks 6 are automatically adjusted in such a way that the middle point of two projections 6a constituting the forks 6 are aligned with the second mark M2 with respect to the widthwise direction of the vehicle 2. At the time of such positioning control, the forks 6 are shifted vertically (the Z direction in FIG. 4) by the second lift cylinders 8b and shifted horizontally (the Y direction in FIG. 4) by the side shift cylinder 11. Those cylinders 8b and 11 function as moving means to move the cargo carrying apparatus vertically and in the widthwise direction of the vehicle 2.

Figure 6:
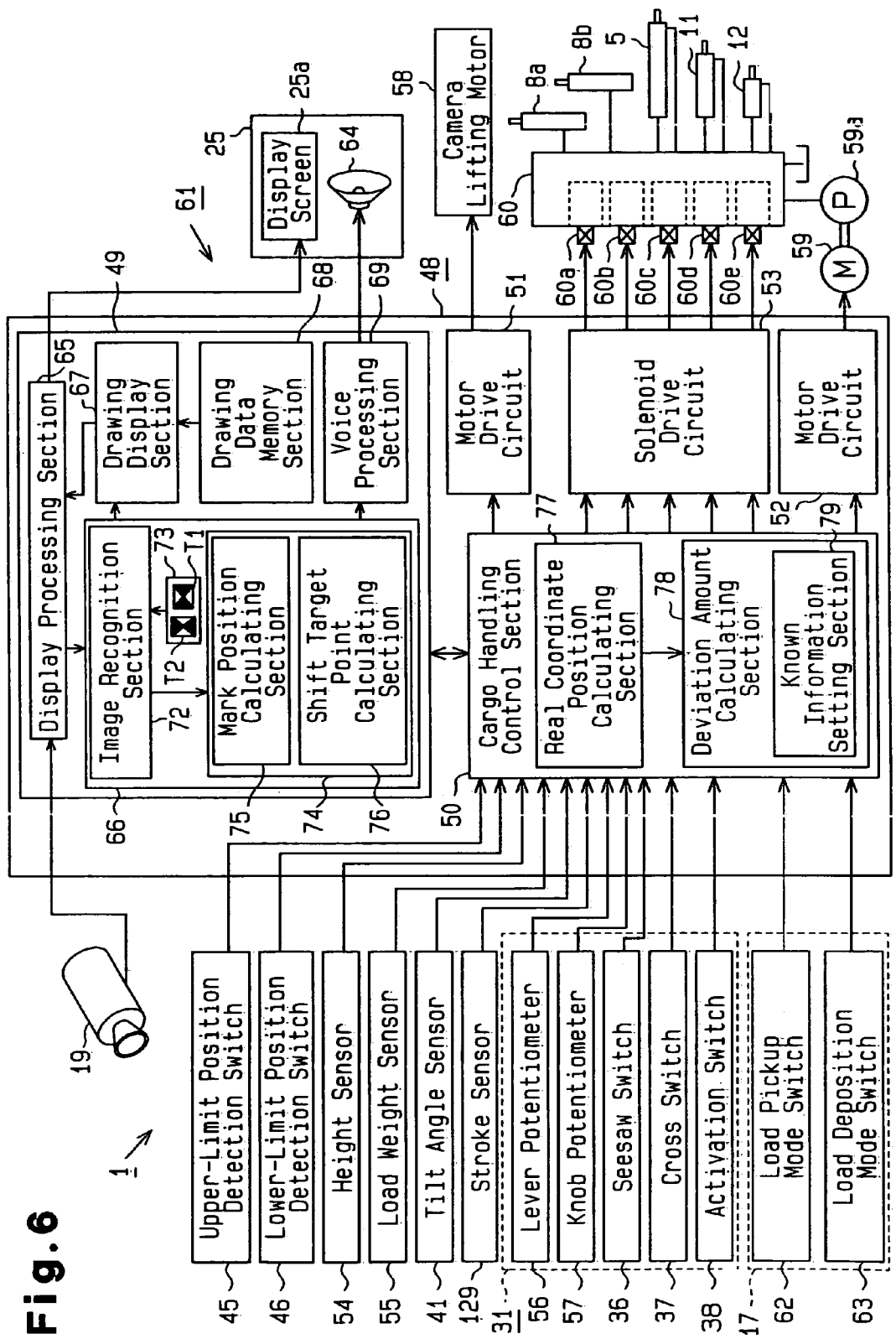
FIG. 6 is a block circuit diagram illustrating the electrical structure of the forklift in FIG. 1.

FIG. 6 is a block circuit diagram illustrating the electrical structure of the forklift 1. The forklift 1 has the controller 48 comprised of a computer or the like and the controller 48 has an image control section 49, a cargo handling control section 50, motor drive circuits 51 and 52 and a solenoid drive circuit 53. The upper-limit position detection switch 45, the lower-limit position detection switch 46, a height sensor 54, a load weight sensor 55, the tilt angle sensor 41 and a stroke sensor 129 are connected to the input side of the cargo handling control section 50. A lever potentiometer 56, which detects the amount of displacement (tilt angle) of the lever body 33, a knob potentiometer 57, which detects the amount of displacement (rotational angle) of the knob 35, and the switches 36 to 38 are connected to the input side of the cargo handling control section 50.

A camera lifting motor 58, which functions as a lift actuator, and a cargo carrying motor 59 are connected to the output side of the cargo handling control section 50 respectively via the motor drive circuit 51 and the motor drive circuit 52. A plurality of electromagnetic proportional valves 60a to 60e assembled to an oil control valve 60 are connected to the output side of the cargo handling control section 50 via the solenoid drive circuit 53. Those electromagnetic proportional valves 60a to 60e respectively correspond to the cylinders 8a, 8b, 5, 11 and 12.

Based on operation signals from the potentiometers 56 and 57 and the switches 36 to 38 provided on the multi lever 31, the cargo handling control section 50 controls the currents to be supplied to the electromagnetic proportional valves 60a to 60e and controls the cargo carrying motor 59. The cargo carrying motor 59 drives a cargo carrying pump 59a, which is a hydraulic pump, to supply a hydraulic fluid to the oil control valve 60. The individual electromagnetic proportional valves 60a to 60e perform hydraulic control on the corresponding cylinders 8a, 8b, 5, 11 and 12 in accordance with an instruction from the cargo handling control section 50.

The height sensor 54 detects if the height of the forks 6 is equal to or higher than a predetermined threshold value (e.g., 2 meters). The height sensor 54 is comprised of, for example, a switch, which is switched on or off when the carriage 9 comes to the topmost position of the inner mast members 7c. The load weight sensor 55 detects the weight of a load (load weight) on the forks 6. In the present embodiment, a pressure sensor, which detects the hydraulic pressure in the first lift cylinder 8a correlated to the load on the forks 6, is used as the load weight sensor 55. The load weight sensor 55 outputs a voltage signal, which has a level according to the load on the forks 6.

The stroke sensor 129, which functions as side shift detecting means, is provided on the side shift cylinder 11. The stroke sensor 129 detects the amount of stroke of the piston rod 11a of the side shift cylinder 11, i.e., the amount of sideway movement of the forks 6 attached to the side shifter 10.

The forklift 1 has an automatic fork positioning system (hereinafter called lock-on system) 61. The lock-on system 61 executes an image recognition process on the mark M1 (M2) based on image data acquired from the camera 19 and executes automatic positioning control on the forks 6 with the recognized mark M1 (M2) as a reference point. The lock-on system 61 includes the camera 19, the display device 25, the activation switch 38, the image control section 49, the cargo handling control section 50 and mode switches 62 and 63.

At the time of automatic positioning control, the cargo handling control section 50, which functions as selection means, sets the operation mode of the lock-on system 61 to one of the load pickup mode and the load deposition mode based on the signal from the load weight sensor 55. When a load W obtained based on the signal from the load weight sensor 55 is equal to or smaller than a predetermined threshold value Wo, the cargo handling control section 50 determines that there is no load on the forks 6 and selects the load pickup mode. When the load W obtained based on the signal from the load weight sensor 55 exceeds the threshold value Wo, on the other hand, the cargo handling control section 50 determines that there is load on the forks 6 and selects the load deposition mode.

The operation mode is automatically set in accordance with the load on the forks 6 in this manner. The load W obtained based on the signal from the load weight sensor 55 includes the weight of the carriage 9 itself. Therefore, the threshold value Wo is set equal to or slightly larger than the load W obtained when no load is present on the forks 6. It is desirable to set the threshold value Wo based on which it is determined that a load is on the forks 6 when a load-free pallet 27 is on the forks 6. That is, it is desirable to set the threshold value Wo in such a way that the pallet 27 itself is determined as a load. The process of setting the operation mode is executed every given time (e.g., several tens of msec).

The mode switches 62 and 63, which are manual operation members, are provided on the steering wheel knob 17 as shown in FIG. 1. One of both mode switches is the load pickup mode switch 62, and the other is the load deposition mode switch 63. While the operation mode of the lock-on system 61 can be automatically set as mentioned earlier, it can be set manually by pressing those switches 62 and 63. That is, those switches 62 and 63 function as selection means. Each switch 62, 63 is wirelessly connected to the cargo handling control section 50. That is, wireless communication is performed between the switches 62 and 63 and the cargo handling control section 50.

When the load pickup mode switch 62 is depressed, the cargo handling control section 50 sets the operation mode of the lock-on system 61 to the load pickup mode. When the load deposition mode switch 63 is depressed, the cargo handling control section 50 sets the operation mode of the lock-on system 61 to the load deposition mode. With regard to the setting of the operation mode, manually setting using the switches 62 and 63 has a priority over automatic setting. The operation mode may be switched between the load pickup mode and the load deposition mode by a single mode switch. In this case, every time the mode switch is depressed, the operation mode is switched.

Figure 7A:
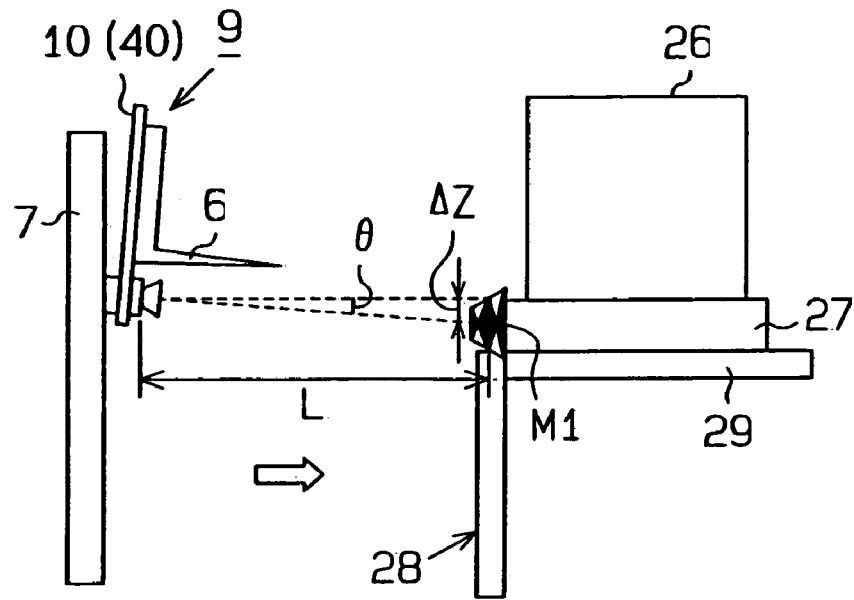
FIG. 7($a$) is a schematic side view depicting forks before undergoing automatic horizontal control.

In case where the deposition surface of the forks 6 is tilted as shown in FIG. 7(a), the camera 19 likewise becomes tilted. When the image of the mark M1 (M2) is picked up by the camera 19 in this state, the real position of the mark M1 (M2) is not accurately reflected in the coordinate system set on the screen 25a (screen coordinate system). Suppose that, for example, the load deposition surface of the forks 6 is tilted by an angle $\theta$ with respect to the horizontal line and the distance from the camera 19 to the mark M1 (M2) is L, as shown in FIG. 7(a). If automatic fork positioning control is carried out in this state, there would occur an error of $\Delta Z$ ($\Delta Z = L \tan \theta$) at the time of positional adjustment of the forks 6 in the vertical direction.

Figure 7B:
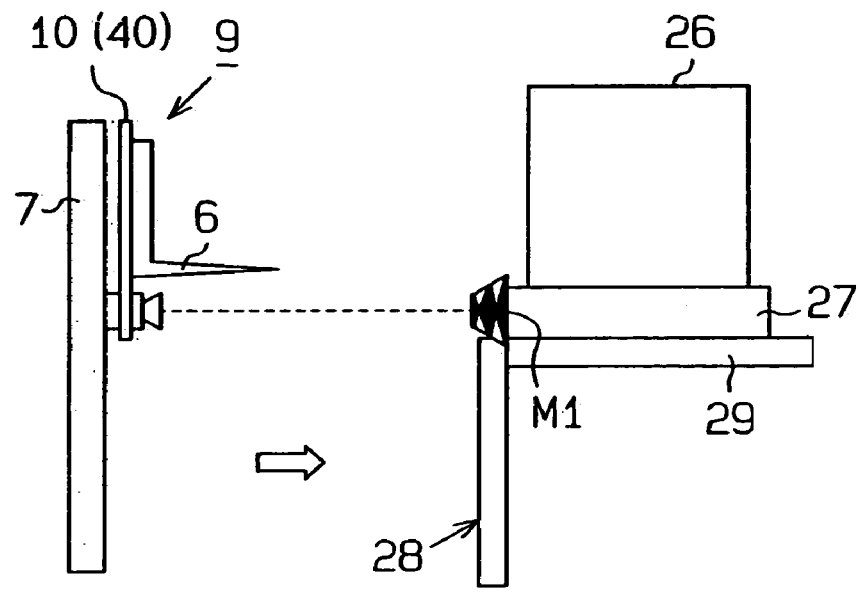
Figure 8A:
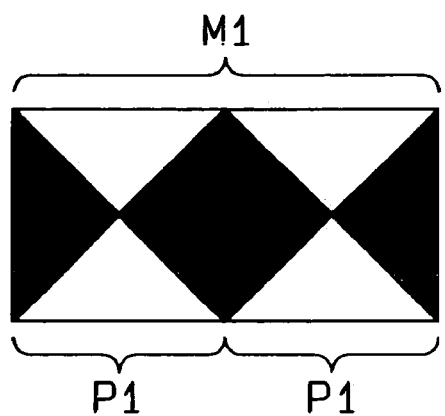
FIG. 8($a$) is a diagram showing a first mark M1 affixed to a pallet.
Figure 8B:
Figure 8C:
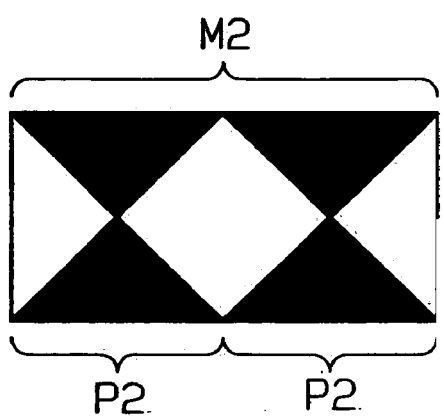
Figure 8D:
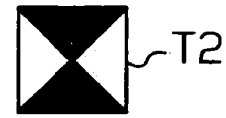

According to the present embodiment, therefore, the cargo handling control section 50 executes automatic horizontal control of the forks 6 prior to automatic fork positioning control. That is, the cargo handling control section 50 always recognizes the tilt angle of the forks 6 based on the signals from the tilt angle sensor 41. Then, when the activation switch 38 is depressed to start automatic positioning control, the cargo handling control section 50 first adjusts the tilt angle of the forks 6 by driving the tilt cylinder 12 in such a way that the load deposition surface of the forks 6 becomes horizontal. As a result, the camera 19 becomes horizontal as shown in FIG. 7(*b*), and the positional adjustment of the forks 6 in the vertical direction is executed accurately in the subsequent automatic positioning control.

The cargo handling control section 50 performs automatic fork positioning control only when the height of the forks 6 is equal to or greater than the threshold value (2 meters), and shifts the camera unit 20 to the storage position when the height of the forks 6 is less than 2 meters. That is, in the state where the carriage 9, which supports the forks 6, is positioned below the topmost end of the inner mast members 7*c*, automatic positioning control is not carried out and the camera unit 20 is positioned in the storage position. The cargo handling control section 50 determines whether or not to permit automatic fork positioning control based on the ON/OFF state of the height sensor 54.

At the time automatic positioning control is carried out, the cargo handling control section 50 places the camera unit 20 in the storage position in load pickup mode and places the camera unit 20 in the exposure position in load deposition mode. The camera lifting motor 58 is stopped when the rising camera unit 20 reaches the upper limit position and the upper-limit detection switch 45 is turned on. The camera lifting motor 58 is stopped when the descending camera unit 20 reaches the lower limit position and the lower-limit detection switch 46 is turned on.

The camera 19 is connected to the input side of the image control section 49 and the display device 25 is connected to the output side of the image control section 49. The display device 25 has the screen 25*a* and a speaker 64. The image control section 49 displays the image, picked up by the camera 19, on the screen 25*a* of the display device 25 and informs the working conditions, a working instruction, etc. by voice through the speaker 64 provided on the display device 25. The image control section 49 executes image processing based on image data acquired from the camera 19.

The image control section 49 has a display processing section 65, an image processing section 66, a drawing display section 67, a drawing data memory section 68 and a voice processing section 69. The display processing section 65 outputs a video signal, input from the camera 19, to the display device 25 to display the image picked up by the camera 19 on the screen 25*a*. The voice processing section 69 performs a voice synthesizing process for voice guidance and outputs a voice signal to the speaker 64. The image processing section 66 receives the image data from the display processing section 65 and performs an image recognition process based on the image data. In the image recognition process, the image processing section 66 computes the coordinates of the mark M1 (M2) and a shift target point 70 (see FIG. 13(*a*) to FIG. 14(*b*)) on the screen 25*a*.

The drawing display section 67, which functions as drawing means, reads drawing data stored in the drawing data memory section 68 and displays the shift target point 70 and a target line 71 (see FIG. 13(*a*) to FIG. 14(*b*)) or the like based on the drawing data on the screen 25*a*. The drawing display section 67 displays the "load pickup mode" on the screen 25*a* (see FIG. 13(*a*) and FIG. 13(*b*)) in load pickup mode and displays the "load deposition mode" (see FIG. 14(*a*) and FIG. 14(*b*)) in load deposition mode.

The image processing section 66, which functions as image processing means, has an image recognition section 72, a template memory section 73 and a screen coordinate position calculating section 74. The screen coordinate position calculating section 74 has a mark position calculating section 75 and a shift target point calculating section 76. The cargo handling control section 50, which functions as target position determining means, deviation amount computing means and control means, has a real coordinate position calculating section 77 and a deviation amount calculating section 78. The deviation amount calculating section 78 has a known information setting section 79.

The following will describe the contents of the processes performed by the image control section 49 and the cargo handling control section 50 at the time of the automatic fork positioning control according to FIGS. 8(*a*) to 12.

Stored in the template memory section 73 in FIG. 6, which functions as memory means, are a template T1 corresponding to the first mark M1 and a template T2 corresponding to the second mark M2. FIG. 8(*a*) shows the first mark M1 and FIG. 8(*b*) shows the template T1 corresponding thereto. FIG. 8(*c*) shows the second mark M2 and FIG. 8(*d*) shows the template T2 corresponding thereto.

The first mark M1 is constituted by two predetermined black and white patterns P1 aligned next to each other. The second mark M2 is constituted by two predetermined black and white patterns P2. It is to be noted that both patterns P1 and P2 have designs with the black and white inverted to each other. The templates T1 and T2 to be used in a pattern matching process to be discussed later respectively have the same designs as the patterns P1 and P2.

Each pattern P1, P2 has a design separated into white and black colors by a plurality of boundary lines extending straight radially around one point. Each pattern P1, P2 in the present embodiment has a design separated into whit-e-and black colors by four areas defined by the two diagonal lines of a square. It is to be noted that the contour line equivalent to the sides of the rectangular shape of the template is not a part of the design.

The size of the mark M1 (M2) to be displayed on the screen 25*a* changes in accordance with the distance between the mark M1 (M2) and the camera 19. In the center portion of the picked-up patterns P1 (P2) of the mark M1 (M2) to be shown on the screen 25*a*, however, a pattern, which coincides with the corresponding template T1 (T2), always exists. Through pattern matching using only a single template T1 (T2), therefore, the image recognition section 72 can recognize the corresponding mark M1 (M2). The size of the template T1 (T2) is determined in such a way that all the marks M1 (M2) picked up within a predetermined distance from the camera 19 can be recognized.

Figure 10A:
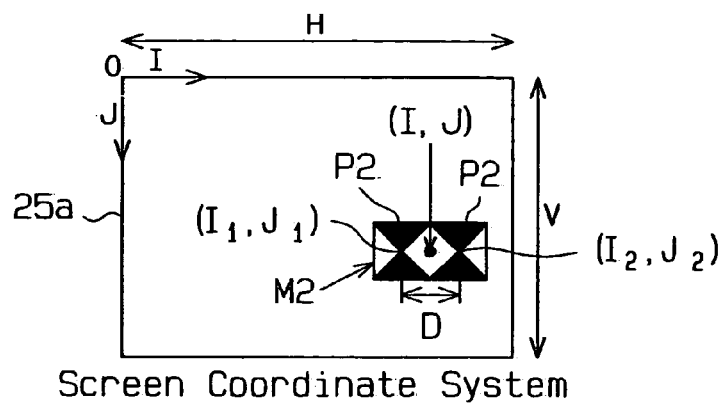
FIG. 10($a$) is a diagram for explaining a screen coordinate system.
Figure 10B:
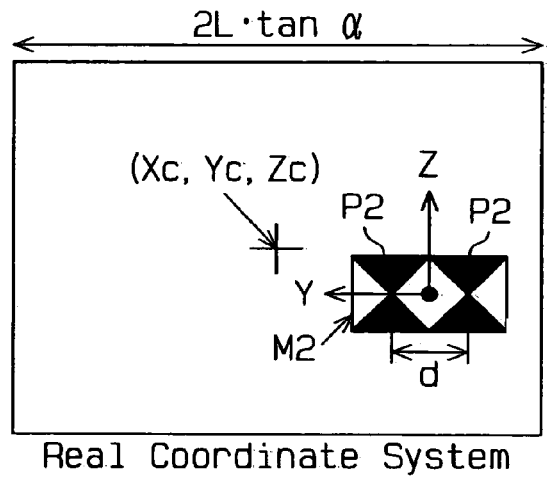

FIG. 10(*a*) is a diagram showing a coordinate system set on the screen 25*a*, i.e., a screen coordinate system. In the screen coordinate system, the horizontal axis is expressed by I and the vertical axis is expressed J. In the screen coordinate system, the coordinates are handled in the units of pixels. In FIG. 10(*a*), H is the number of horizontal pixels of the screen 25*a* and V is the number of vertical pixels of the screen 25*a*. Note that, the screen coordinate system is set in the image processing section 66 as a coordinate system relating to the image data acquired by the camera 19 regardless of whether or not the display device 25 is present. Therefore, the screen coordinate system can be paraphrased as the image coordinate system. FIG. 10(b) is a diagram showing an actual coordinate system where a cargo handling target exists, i.e., a real coordinate system. The real coordinate system has a similar relation to the screen coordinate system.

In load pickup mode, for example, the image of the first mark M1 affixed to the pallet 27 on the shelf plate 29 is acquired by the camera 19 and a pattern matching process to recognize the first mark M1 in the image data is performed using the template T1 corresponding to the first mark M1. In load deposition mode, the image of the second mark M2 affixed to the shelf plate 29 is acquired by the camera 19 and a pattern matching process to recognize the second mark M2 in the image data is performed using the template T2 corresponding to the second mark M2.

Figure 9:
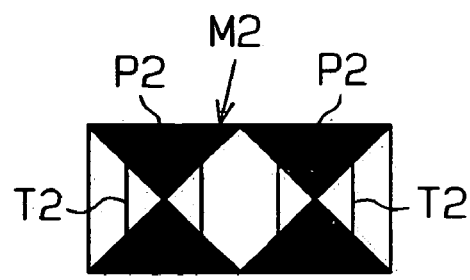
FIG. 9 is a diagram for explaining a pattern matching process.

The pattern matching process in load deposition mode will be discussed according to FIG. 9 to FIG. 10(b). Based on the image data of the second mark M2 in the real coordinate system acquired by the camera 19, the image recognition processing section 72 matches the template T2 in the screen coordinate system, at two locations, with respect to the two patterns P2, P2 constituting the second mark M2 and recognizes those two patterns P2, P2. Then, the image recognition processing section 72 recognizes the second mark M2 in the screen coordinate system. FIG. 9 shows the state in which the template T2 is matched with the two patterns P2, P2.

After recognition of the second mark M2, the mark position calculating section 75 computes coordinates (I1, J1), (I2, J2) of the center points (radial center points) of the individual patterns P2, P2 in the screen coordinate system. Then, the mark position calculating section 75 computes the barycentric coordinates (I, J) of the second mark M2 and a center distance D of both patterns P2, P2 based on those two coordinate values. The barycentric coordinates (I, J) indicate the position of the second mark M2 in the screen coordinate system, and the center distance D indicates the size of the second mark M2 in the screen coordinate system. The size of the second mark M2 in the screen coordinate system reflects the distance between the camera 19 and the cargo handling target.

Even in load pickup mode, the pattern matching process is carried out in a manner similar to that in the case of the load deposition mode. That is, the first mark M1 in the screen coordinate system is recognized using the template T1 based on the image data of the first mark M1 in the real coordinate system acquired by the camera 19. Then, the barycentric coordinates (I, J) of the first mark M1 and the center distance D of the patterns P1, P1 are computed.

Figure 11A:
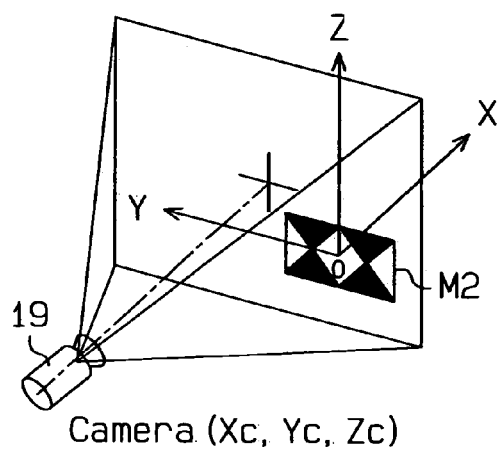
FIG. 11($a$) is a perspective view for explaining the real coordinate system.

The real coordinate position calculating section 77 performs geometric conversion using the values of the barycentric coordinates (I, J) and the center distance D to compute three-dimensional relative positional coordinates (Xc, Yc, Zc) with respect to the mark M1 (M2) from the camera 19 in the real coordinate system shown in FIG. 10(b). As shown in FIG. 11(a), the real coordinate system has three-dimensional coordinates with the center (barycenter) of the mark M1 (M2) as the origin O. In the real coordinate system, the Y axis and Z axis perpendicular to each other in a vertical plane facing the camera 19 are set and the X axis perpendicular to that vertical plane is set. The X axis and Y axis are perpendicular to each other in a horizontal plane. The relative positional coordinates (Xc, Yc, Zc) represent the position of the camera 19 with respect to the mark M1 (M2) Therefore, the position of the mark M1 (M2) in the real coordinate system can be specified by obtaining the relative positional coordinates (Xc, Yc, Zc).

The following will discuss a method of obtaining the relative positional coordinates (Xc, Yc, Zc) of the camera 19.

Figure 11B:
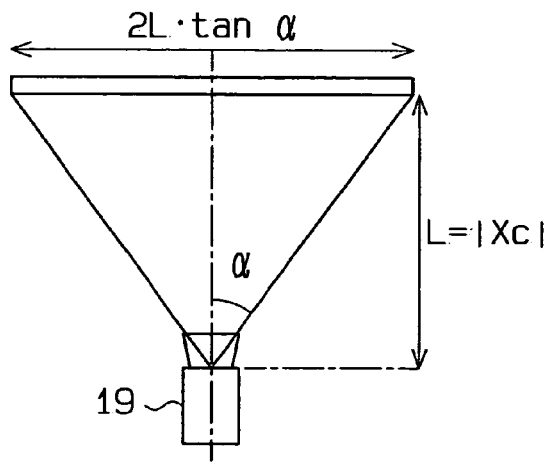

FIG. 11(b) shows the state in which the camera 19 is seen from above in the real coordinate system. As shown in FIG. 11(b), the horizontal width of the image pickup range by the camera 19 in the real coordinate system is indicated by 2L·tan α, which is equivalent to the number of horizontal pixels H of the screen 25a in the screen coordinate system. The angle a is a half the horizontal angle of view of the camera 19. L is the distance between the camera 19 and the YZ plane in the screen coordinate system and is equal to the absolute value of the component Xc in the relative positional coordinates. A center distance d (see FIG. 10(b)) of the two patterns P1, P1 (P2, P2) of the mark M1 (M2) in the real coordinate system is equivalent to the center distance D (see FIG. 10(a)) in the screen coordinate system. Therefore, the ratio of the real coordinate system to the screen coordinate system is expressed by d:D. Further, the component Yc in the relative positional coordinates of the camera 19 is equivalent to I–H/2 in the screen coordinate system. The component Zc in the relative positional coordinates of the camera 19 is equivalent to J–V/2 in the screen coordinate system.

The screen coordinate system and the real coordinate system have the above-described relationship. Therefore, the individual components in the relative positional coordinates (Xc, Yc, Zc) of the camera 19 are computed from the following equations (1), (2) and (3) by performing geometric conversion using the barycentric coordinates (I, J) and the center distance D obtained in the screen coordinate system.

$$Xc = -L = -Hd/(2D \tan \alpha) \quad (1)$$

$$Yc = d/D(I - H/2) \quad (2)$$

$$Zc = d/D(J - V/2) \quad (3)$$

Figure 12:
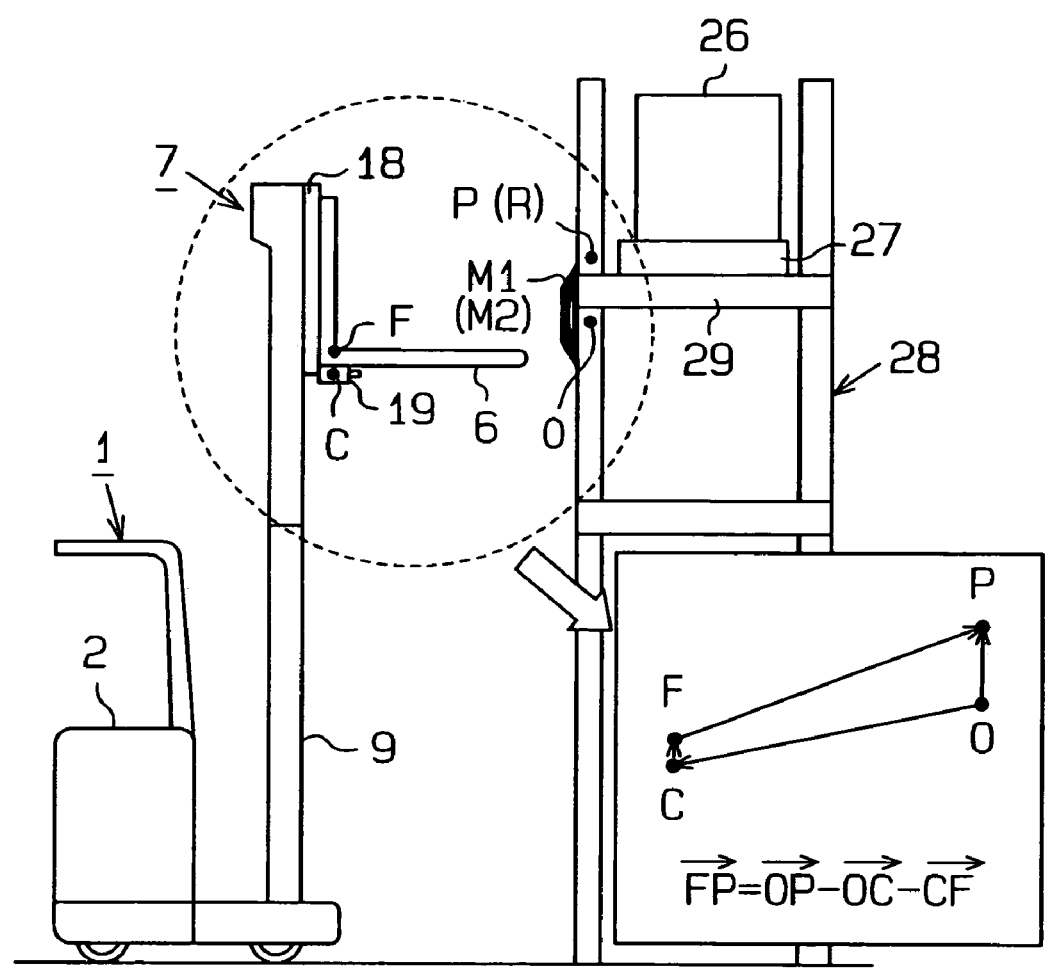
FIG. 12 is a schematic side view for explaining automatic positioning control for forks.

Given that, in the real coordinate system, the position of the camera 19 is C, the position of the proximal ends of the forks 6 is F, the position of the target point is P and the barycentric position of the mark M1 (M2) (the origin in the real coordinate system) is O, as shown in FIG. 12, the relative positional coordinates (Xc, Yc, Zc) are expressed by the component of a vector OC. The position of the target point (target position) P is the position of where the forks 6 are to be positioned, and is the position of the pallet 27 (the mark barycentric position O) in load pickup mode and a position at a predetermined height (10 to 20 cm) from the shelf surface 29a in load deposition mode. In other words, the mark barycentric position O and the target position P have a specific relationship. Therefore, the target position P is naturally determined based on the mark barycentric position O.

The deviation amount calculating section 78 acquires the amount of deviation between the current position F of the forks 6 and the target position P based on the vector OC, i.e., the relative positional coordinates (Xc, Yc, Zc). This deviation amount is the moving distance in each direction of the X, Y and Z axes that is needed to position the forks 6 with respect to the cargo handling target, and is expressed as the component of a vector FP. Before computing the deviation amount of the forks 6, first, the known information setting section 79 reads a vector CF and vector OP as known information. That is, assuming that a camera position C and a fork position F lie on the same vertical line, the vector CF is equivalent to the distance between the camera position C and the fork position F. As the mark barycentric position O and the target position P lie on the same vertical line, the vector OP is equivalent to the distance between the mark barycentric position O and the target position P. Those distances, i.e., the relationship between the camera position C and the fork position F and the relationship between the mark barycentric position O and the target position P can both be set beforehand as known information.

As shown in FIG. 12, the positions O, P, C and F have the relationship of "vector FP=vector OP−vector OC−vector CF". Once the relative positional coordinates (Xc, Yc, Zc) of the camera 19, which are the components of the vector OC, are obtained, the vector FP representing the amount of positional deviation of the forks 6 with respect to the target position P can be acquired by using the known information, the vector OP and vector CF. At the time automatic fork positioning control is executed, therefore, the cargo handling control section 50 adjusts the positions of the forks 6 by driving the second lift cylinders 8b and the side shift cylinder 11 in such a way that the vector FP computed by the deviation amount calculating section 78 becomes zero.

As shown in FIGS. 13(a) to 14(b), at the time of executing automatic fork positioning control, the shift target point 70, which becomes the index of the current position F of the forks 6, is displayed on the screen 25a. The shift target point calculating section 76, which functions as target point computing means, computes the center coordinates (It, Jt) of the shift target point 70. In load pickup mode, the center coordinates (It, Jt) of the shift target point 70 are obtained as follows. That is, let the target position P be a load pickup position P equivalent to the position of the pallet 27 (barycentric position O of the first mark M1). Then let the components of the vector OP, which is known information, be (Xp, Yp, Zp) and let the components of the vector CF, which is also known information, be (Xcf, Ycf, Zcf). In this case, the center coordinates (It, Jt) of the shift target point 70 are obtained from the following equations (4) and (5).

$$It = H/2 + (Yp - Ycf) \times D/d \quad (4)$$

$$Jt = V/2 + (Zp - Zcf) \times D/d \quad (5)$$

In load deposition mode, on the other hand, the center coordinates (It, Jt) of the shift target point 70 are obtained as follows. That is, given that the target position P is a load deposition position R equivalent to the position at a predetermined height (10 to 20 cm) from the shelf surface 29a, the vectors CF and OR-become known information. The vector OR is equivalent to the distance between the mark barycentric position O and the load deposition position R. Given that the components of the vector OR are (Xr, Yr, Zr) and the components of the vector CF are (Xcf, Ycf, Zcf), the center coordinates (It, Jt) of the shift target point 70 are obtained from the following equations (6) and (7).

$$It = H/2 + (Yr - Ycf) \times D/d \quad (6)$$

$$Jt = V/2 + (Zr - Zcf) \times D/d \quad (7)$$

After the center coordinates (It, Jt) of the shift target point 70 are acquired, the drawing display section 67 draws the shift target point 70 at the position of the center coordinates (It, Jt) on the image on the screen 25a as shown in FIG. 13(a) to FIG. 14(b). The shift target point 70 is a figure having four triangles arranged at equiangular intervals with their vertexes directed to the center, and the center point surrounded by the four vertexes becomes the center coordinates (It, Jt). As the forks 6 move at the time of automatic positioning control, the mark M1 (M2) moves so as to match with the shift target point 70 on the screen 25a. That is, the shift target point 70 is the target point on the screen 25a to which the mark M1 (M2) should be shifted.

The flow of the automatic positioning control on the forks 6 will be described next.

Figure 13A:
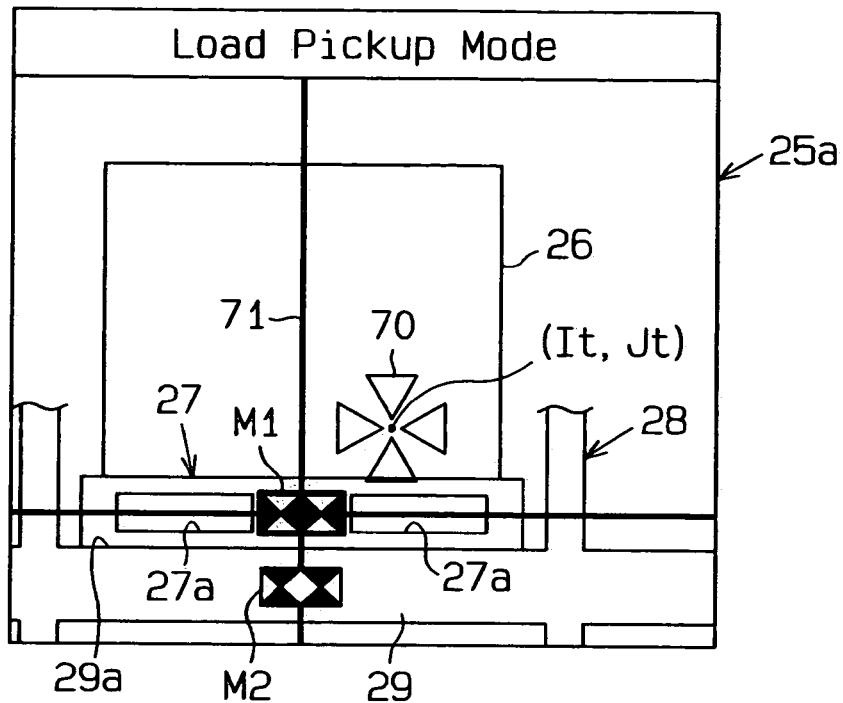
FIG. 13($a$) is a diagram showing a screen before fork positioning in load pickup mode.
Figure 13B:
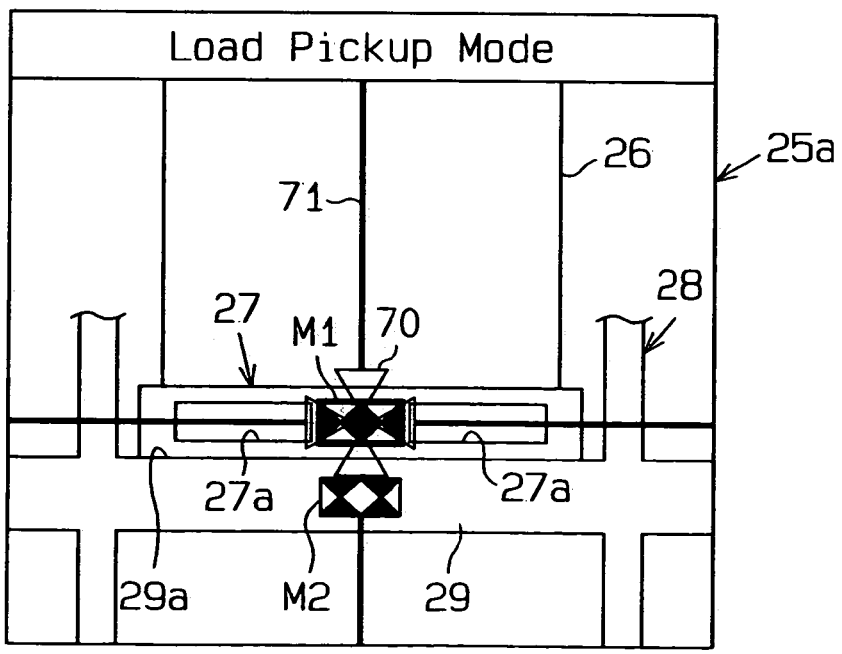

First, the forks 6 are lifted up to a height of 2 meters or higher by manipulating the knob 35 of the multi lever 31. Then, in the case of doing a load pickup work, the pallet 27, which is the load pickup target, and the first mark M1 affixed to the pallet 27 are shown on the screen 25a, as shown in FIG. 13(a). When the activation switch 38 is depressed in this state, the cargo handling control section 50 executes automatic horizontal control so that the forks 6 become a horizontal state. Subsequently, the image recognition section 72 performs an image recognition process (pattern matching process) so that the image of the first mark M1 is recognized. As a result, in the screen coordinate system, the barycentric coordinates (I, J) and the center distance D relating to the first mark M1 are computed.

Subsequently, the real coordinate position calculating section 77 computes the coordinates (Xc, Yc, Zc) of the camera 19 or the vector OC. Based on the vector OC and the vectors CF and OP, which are known information, the deviation amount calculating section 78 computes the vector FP. Then, the cargo handling control section 50 drives the cylinders 8b and 11 in such a way that the vector FP becomes zero, and the automatic positioning of the forks 6 is carried out. Accordingly, the state shown in FIG. 13(a) becomes the state shown in FIG. 13(b) where the shift target point 70 matches with the first mark M1 on the screen 25a, thus completing the automatic fork positioning control. Then, the forks 6 are positioned in the insertion holes 27a of the pallet 27. The movement of the forks 6 in the direction of the X axis is executed by the manual operation by the driver.

As the forks 6 are automatically positioned with respect to the pallet 27 this way, the driver does not need to manually position the forks 6, thus lightening the cargo carrying work. As automatic horizontal control on the forks 6 is carried out prior to automatic positioning control, the position of the target in the real coordinate system, picked by the camera 19, is accurately reflected on the screen coordinate system and positioning control is performed accurately. Further, this automatic horizontal control sets the forks 6 horizontal, so that the forks 6 are smoothly inserted into the insertion holes 27a of the pallet 27 at the time of a load pickup work.

Figure 14A:
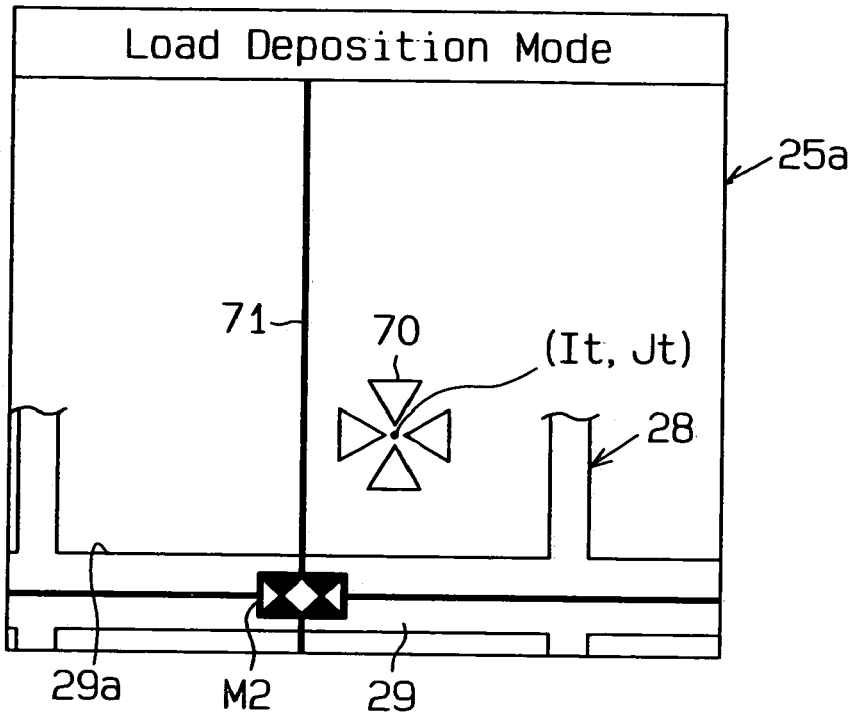
FIG. 14($a$) is a diagram showing a screen before fork positioning in load deposition mode.

In the case of a load deposition work, on the other hand, the shelf plate 29, which is the load deposition target, and the second mark M2 affixed to the shelf plate 29 are shown on the screen 25a, as shown in FIG. 14(a). When the activation switch 38 is depressed in this state, automatic horizontal control of the forks 6 is executed, then the image recognition of the second mark M2 is performed, and the barycentric coordinates (I, J) and the center distance D relating to the second mark M2 are computed, as done in the case of the load pickup work. Then, based on the vector OC indicating the camera coordinates (Xc, Yc, Zc) and the vectors CF and OR, which are known information, the deviation amount calculating section 78 computes the vector FR.

Figure 14B:
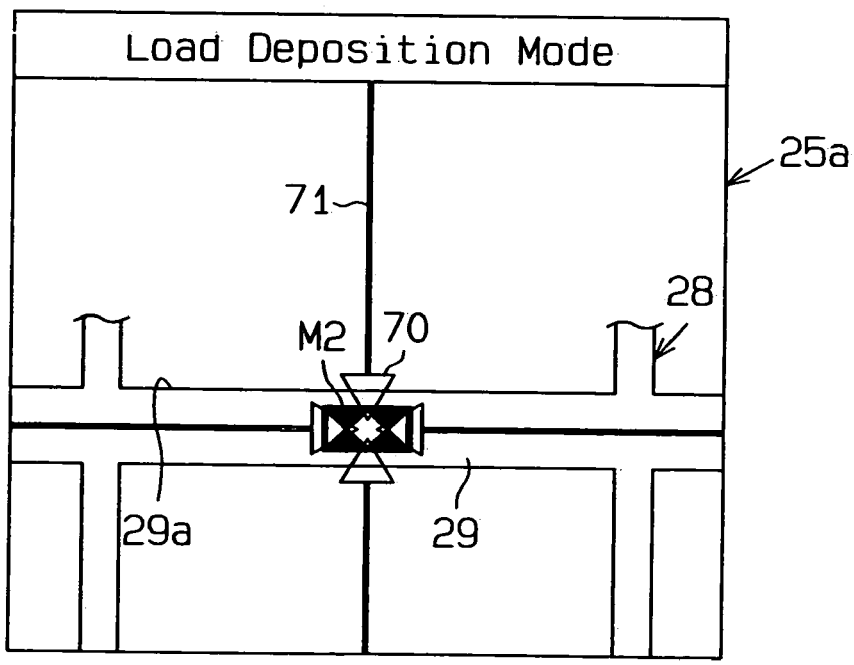

Then, based on the vector FP, the cargo handling control section 50 drives the second lift cylinders 8b in such a way that the forks 6 are positioned only in the vertical direction. Then, by operating the right operation section 37c or the left operation section 37d of the cross switch 37, the forks 6 are shifted sideways manually in such a way that the shift target point 70 coincides with the second mark M2 on the screen 25a. Accordingly, the shift target point 70 coincides with the second mark M2 as shown in FIG. 14(b), making the forks 6 positioned. At this time, the forks 6 are positioned at a predetermined height (10 to 20 cm) from the shelf surface 29a. As in the case of the load pickup work, the movement of the forks 6 in the direction of the X axis is executed by the manual operation by the driver.

When the forks 6 with the load 26 placed thereon are automatically moved sideways, load collapse is likely to occur. At the time of automatic positioning control in load deposition mode, however, the forks 6 are automatically positioned only in the vertical direction, so that load collapse originated from automatic positioning does not occur.

Even in load deposition mode, the forks 6 may be shifted sideways automatically. In this case, it is desirable that the moving speed of the forks 6 be set to such a speed as not to cause load collapse.

The present embodiment has the following advantages.

The lock-on system 61 is mounted on the forklift 1 and the forks 6 are automatically positioned with respect to the pallet 27 or the rack 28 by the lock-on system 61. Therefore, the driver need not do the positioning of the forks 6 manually, so that the burden of a cargo carrying work at a high place can be reduced.

The multi lever 31 is provided with the activation switch 38 that activates automatic fork positioning control. Depressing this activation switch 38 can start automatic fork positioning control at an arbitrary timing.

The forklift 1 is provided with the display device 25. Viewing the screen 25a of the display device 25, the state of the positioning of the forks 6 can be confirmed. As the shift target point 70 is drawn on the screen 25a, it is possible to easily determine whether or not the forks 6 have been positioned from the positional relationship between the shift target point 70 and the mark M1 (M2).

The steering wheel knob 17 is provided with the load pickup mode switch 62 and the load deposition mode switch 63. As the operation mode of the lock-on system 61 can be manually set, it is possible to flexibly cope with the driver's demands.

Automatic horizontal control on the forks 6 is executed before automatic fork positioning control is performed. This results in accurate execution of automatic positioning control and facilitates cargo carrying work using the forks 6.

The camera 19 is positioned in the storage position in load pickup mode and is positioned in the exposure position in load deposition mode. Therefore, the field of view for image pickup is not interfered with a load on the forks 6. In case where the height of the forks 6 is less than 2 meters, the camera 19 is positioned in the storage position, so that the camera 19 does not interfere with the ground or the like even when the forks 6 reach the lowermost end.

Next, the description of the second embodiment of the present invention will be given, according to FIG. 15 to FIG. 18, around the differences from the first embodiment in FIG. 1 to FIG. 14(b). Same member symbols are used for those identical to the members of the first embodiment. The drawings that have been used in explaining the first embodiment should be referred to as needed.

Figure 15:
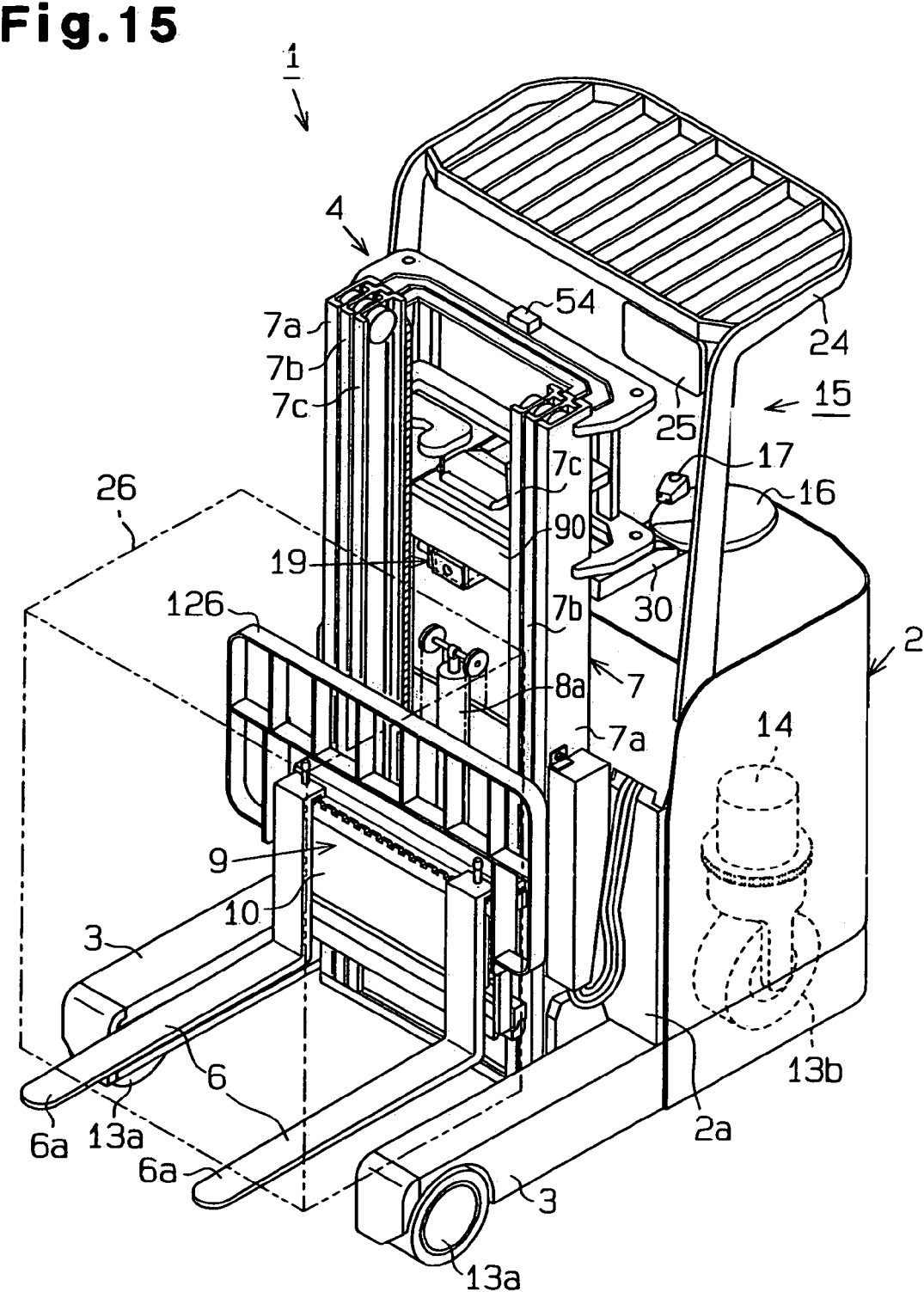
FIG. 15 is a perspective view of a forklift according to a second embodiment of the present invention.

In the present embodiment, as shown in FIG. 15, the camera 19 is secured to a horizontal middle beam 90, which couples both right and left inner mast members 7c. The middle beam 90 is laid horizontally in a position slightly above the height-directional center of both inner mast members 7c and the camera 19 is mounted to the bottom side of the middle beam 90.

In the forklift 1 equipped with a telescopic type lifting mechanism as in the present embodiment, when the forks 6 are lifted up and down in a position higher than the topmost end of the inner mast members 7c, the forks 6 are held at the topmost end of the inner mast members 7c, making the positional relationship between the forks 6 and the camera 19 in the vertical direction always constant. Even if the camera 19 is secured in a state facing frontward of the forks 6, the work area in front of the forks 6 can always be picked up by the camera 19 positioned below the forks 6 when the forks 6 are at the topmost end of the inner mast members 7c.

In the present embodiment, automatic fork positioning control is executed only when the height of the forks 6 is equal to or greater than a predetermined threshold value (2 meters), i.e., when the forks 6 are positioned at or higher than the topmost end of the inner mast members 7c, as per the first embodiment in FIG. 1 to FIG. 14(b).

Figure 16:
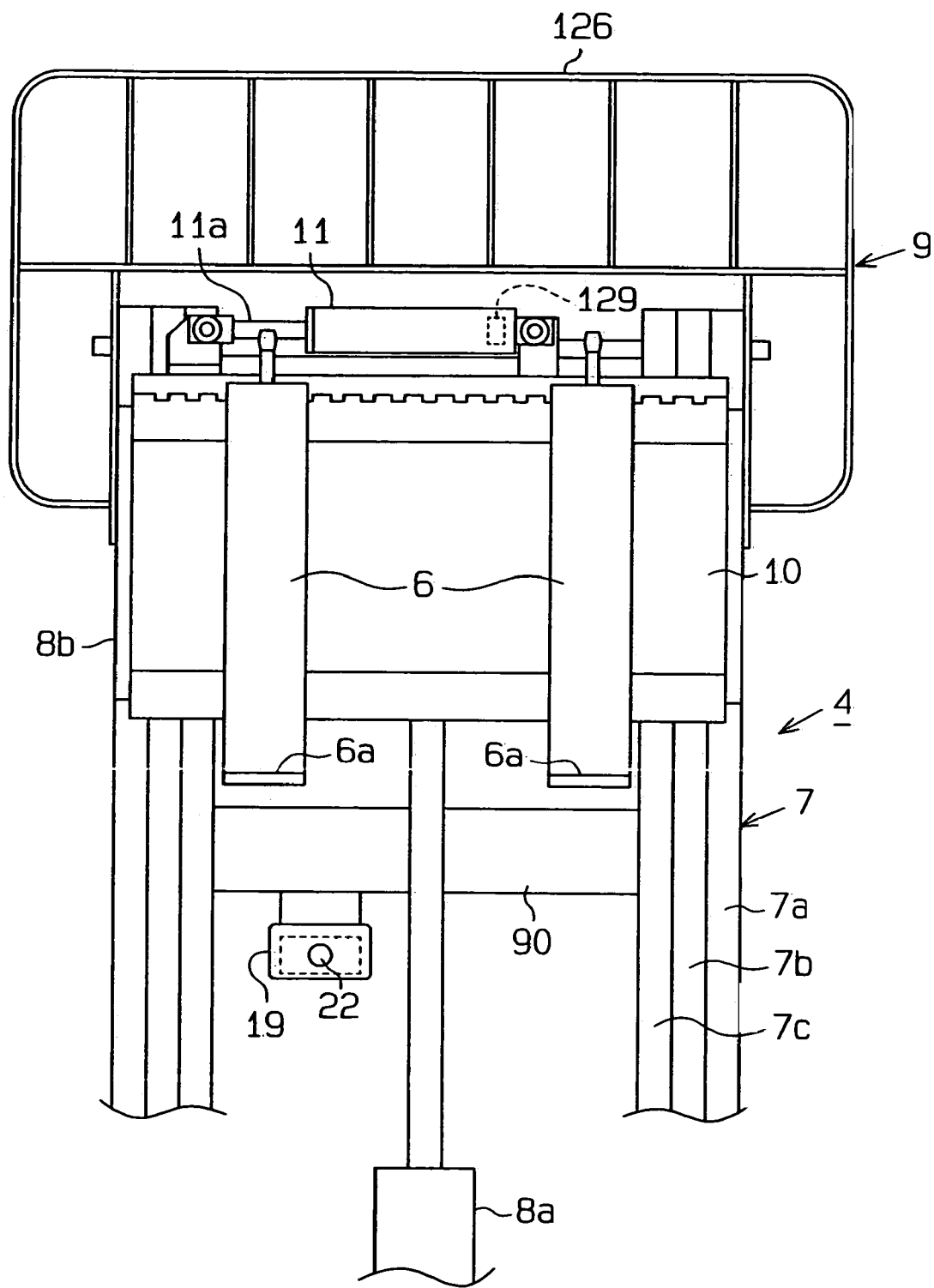
FIG. 16 is a partial front view showing a mast assembly of the forklift in FIG. 15.
Figure 17:
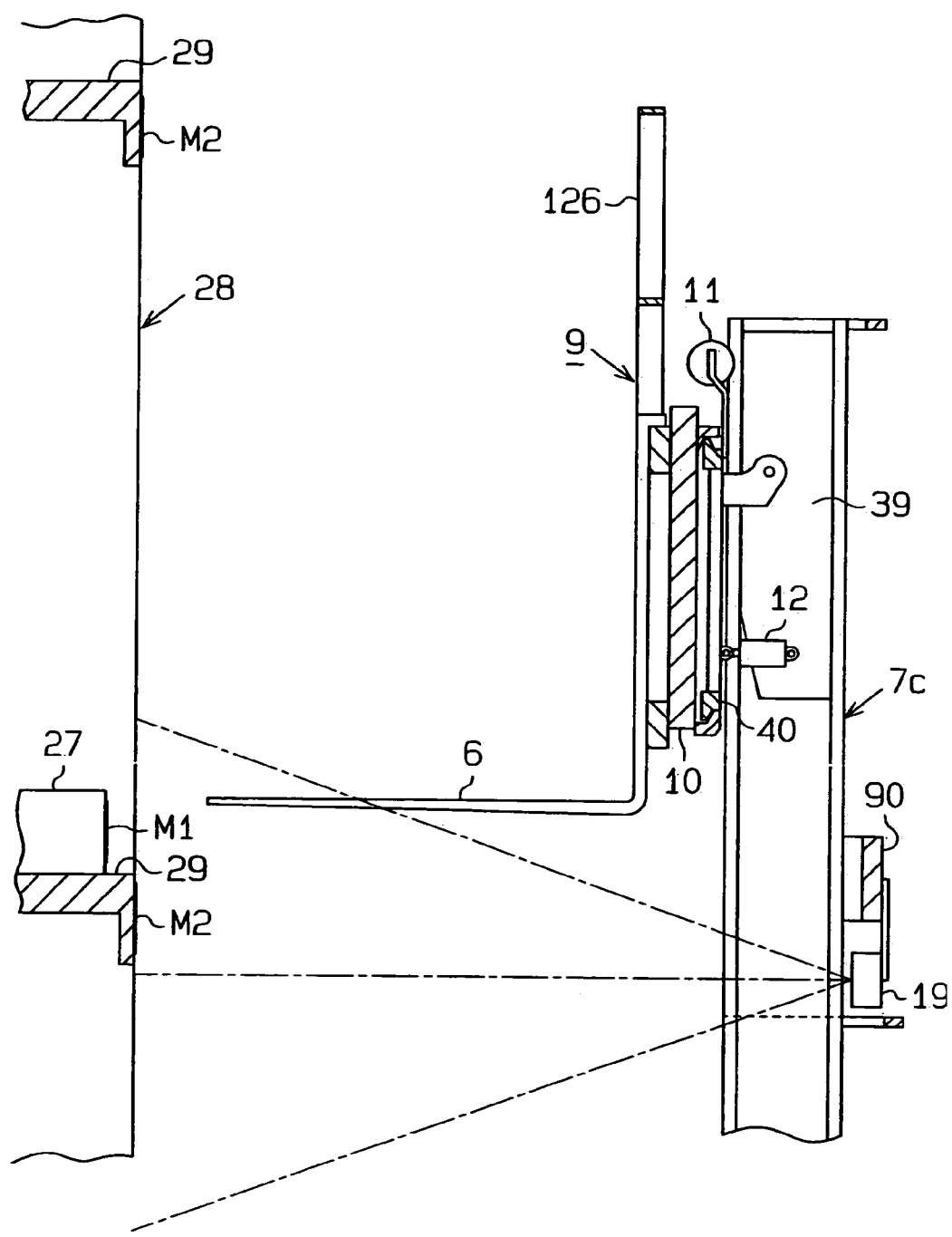
FIG. 17 is a side cross-sectional view of the mast assembly in FIG. 16.

FIG. 16 and FIG. 17 show the carriage 9 positioned at the topmost end of the inner mast members 7c. FIG. 16 shows the side shifter 10 and the forks 6 positioned in the reference position or the center position in their horizontal moving range. The side shift cylinder 11 shifts the side shifter 10 by a predetermined distance (e.g., 50 to 100 mm) at a time in the right and left directions from the reference position with respect to the finger bar 40.

With the carriage 9 positioned at the topmost end of the inner mast members 7c, the camera 19 is positioned below the forks 6 by a predetermined distance. With the carriage 9 positioned at the topmost end of the inner mast members 7c, therefore, even if a load is placed on the forks 6, the load does not block the image pickup range of the camera 19. With the forks 6 being in the reference position, the camera 19 is deviated to one side from the center point of the two projections 6a that constitute the forks 6. That is, as the camera 19 is positioned at the back of the first lift cylinder 8a, the camera 19 is arranged in such a way that the image pickup range is not interfered with the first lift cylinder 8a.

In the present embodiment, automatic fork positioning control is carried out in approximately the same manner as done in the embodiment in FIG. 1 to FIG. 14(b). In the present embodiment, however, the camera 19 is secured to the middle beam 90 that couples both inner mast members 7c. Unlike in the embodiment in FIG. 1 to FIG. 14(b), therefore, the camera 19 does not move sideways together with the forks 6. At the time of positioning control on the forks 6, therefore, it is necessary to consider the amount of deviation of the forks 6 in the Y-axial direction with respect to the camera 19. That is, at the time of acquiring the vector FP representing the deviation amount between the current position F of the forks 6 and the target position P, it is necessary to consider the amount of deviation of the camera 19 in the Y-axial direction with respect to the forks 6 in the reference position and the amount of deviation of the forks 6 in the Y-axial direction with respect to the camera 19.

Figure 18:
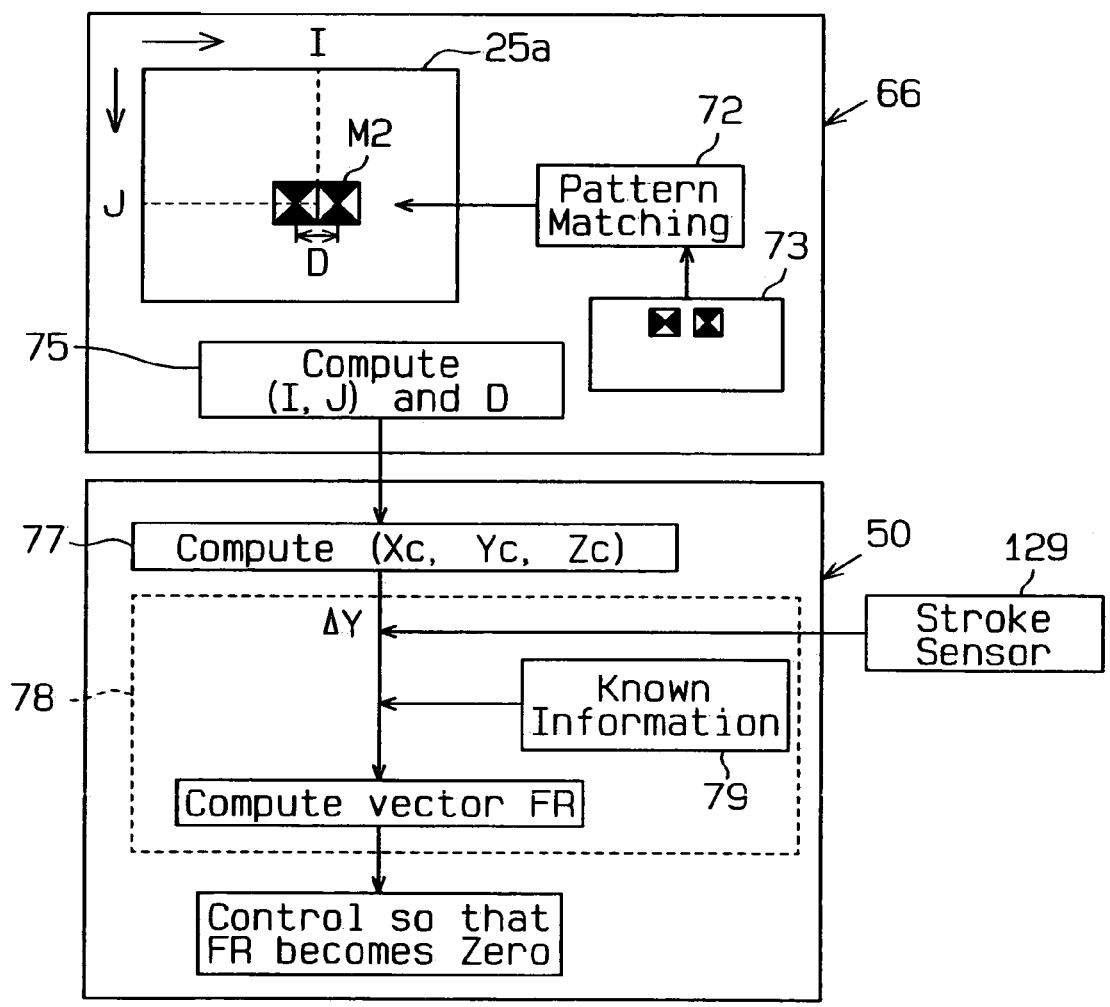
FIG. 18 is a diagram for explaining automatic fork positioning control.

Next, the flow of automatic fork positioning control will be described according to FIG. 18. FIG. 18 shows an example of the load deposition mode.

First, with the mark M1 (M2) affixed to a cargo handling target shown on the screen 25a, when the activation switch 38 is depressed, the cargo handling control section 50 executes automatic horizontal control so that the forks 6 become a horizontal state, as per the embodiment in FIG. 1 to FIG. 14(b). Subsequently, the image recognition processing section 72 performs an image recognition process (pattern matching process) so that the image of the mark M1 (M2) is recognized. Based on the image recognition, the mark position calculating section 75 computes the barycentric coordinates (I, J) and the center distance D relating to the mark M1 (M2) in the screen coordinate system. Note that as the camera 19 is not tilted in the present embodiment, automatic horizontal control on the forks 6 need not be carried out.

The real coordinate position calculating section 77 acquires the relative positional coordinates (Xc, Yc, Zc) of the camera 19 in the real coordinate system, i.e., the vector OC (see FIG. 12) by using the barycentric coordinates (I, J) and the center distance D. Then, based on the relative positional coordinates (Xc, Yc, Zc), the deviation amount calculating section 78 acquires the deviation amount between the current position F of the forks 6 and the target position P, i.e., the vector FP (see FIG. 12) in consideration of the deviation amount of the forks 6 in the Y-axial direction with respect to the camera 19.

In the first embodiment, as already explained, at the time of computing the vector FP, the vector OP between the mark barycentric position O and the target position P, and the vector CF between the camera position C and the fork position F are used as known information. In this embodiment too, as the mark barycentric position O and the target position P lie on the same vertical line, the vector OP is used as known information at the time of computing the vector FP. In the present embodiment, however, the vector CF changes in accordance with the movement of the forks 6 in the Y-axial direction with respect to the camera 19.

In load pickup mode, the vector FP is obtained as follows. That is, let the target position P be a load pickup position P equivalent to the position of the pallet 27 (barycentric position O of the first mark M1). Then let the components of the vector OP, which is known information, be (Xp, Yp, Zp), let the components of the vector CF, which is a variable, be (Xcf, Ycf, Zcf) and let the components of the vector FP to be acquired be (Xfp, Yfp, Zfp). Of the components (Xcf, Ycf, Zcf) of the vector CF, the X-axial component Xcf and Z-axial component Zcf are known constant values, and only the Y-axial component Ycf is a variable. As has been described in the first embodiment, the relationship of "vector FP vector OP–vector OC–vector CF" is satisfied. Therefore, the components (Xfp, Yfp, Zfp) of the vector FP are expressed by the following equation (8).

$$(Xfp, Yfp, Zfp) = (Xp-Xc-Xcf, Yp-Yc-Ycf, Zp-Zc-Zcf) \quad (8)$$

In load deposition mode, on the other hand, the target position P is regarded as a load deposition position R equivalent to the position at a predetermined height (10 to 20 cm) from the shelf surface 29a. In the following description of the load deposition mode, therefore, the vectors FP and OP that have been discussed in the load pickup mode respectively correspond to the vectors FR and OR. Let the components of the vector OR, which is known information, be (Xr, Yr, Zr), and let the components of the vector FR to be acquired be (Xfr, Yfr, Zfr). The components of the vectors CF and OC are expressed in the same way as done in the case of the load pickup mode. The components (Xfr, Yfr, Zfr) of the vector FR are expressed by the following equation (9).

$$(Xfr, Yfr, Zfr) = (Xr-Xc-Xcf, Yr-Yc-Ycf, Zr-Zc-Zcf) \quad (9)$$

As described above, the Y-axial component Ycf of the vector CF is a variable, which varies in accordance with the amount of the movement of the forks 6 in the Y-axial direction, in the equations (8) and (9). The Y-axial component Ycf is obtained based on the amount of the stroke of the piston rod 11a of the side shift cylinder 11 measured by the stroke sensor 129 (see FIG. 6). Here, with the state of the piston rod 11a protracting most being a reference, the retracted amount of the piston rod 11a from the reference position is expressed as the stroke amount ΔY of the piston rod 11a. Given that the stroke amount (retracted amount) ΔY of the piston rod 11a protracting most is zero and the Y-axial component Ycf at that time is Ycf0, the Y-axial component Ycf is given by the following equation (10).

$$Ycf = Ycf0 + \Delta Y \quad (10)$$

In the present embodiment, the barycentric center O of the first mark M1 coincides with the load pickup position P, which is the target position P, in load pickup mode. Therefore, the Y-axial component Yp of the vector OP in load pickup mode becomes zero. In load pickup mode, therefore, the Y-axial component Yfp of the vector FP is given by the following equation (11) based on the equations (8) and (10). Further, the Z-axial component Zfp of the vector FP is given by the following equation (12) based on the equation (8).

$$Yfp = -Yc - Ycf0 - \Delta Y \quad (11)$$

$$Zfp = Zp - Zc - Zcf \quad (12)$$

In load deposition mode, on the other hand, the barycentric center O of the second mark M2 lies on the same vertical line as the load deposition position R, which is the target position P. Therefore, the Y-axial component Yr of the vector OR in load deposition mode becomes zero. In load deposition mode, therefore, the Y-axial component Yfr of the vector FR is given by the following equation (13) based on the equations (9) and (10). Further, the Z-axial component Zfr of the vector FR is given by the following equation (14) based on the equation (9).

$$Yfr = -Yc - Ycf0 - \Delta Y \quad (13)$$

$$Zfr = Zr - Zc - Zcf \quad (14)$$

In the individual components in the equations (11) to (14), Ycf0, Zp, Zr and Zcf are known information. The retracted amount ΔY of the piston rod 11a of the side shift cylinder 11 is measured by the stroke sensor 129. Yc and Zc are obtained as components of the relative positional coordinates (Xc, Yc, Zc) of the camera 19 by the real coordinate position calculating section 77. In load pickup mode, therefore, the Y-axial component Yfp and Z-axial component Zfp of the vector FP can be acquired according to the equations (11) and (12). In load deposition mode, the Y-axial component Yfr and Z-axial component Zfr of the vector FR can be acquired according to the equations (13) and (14).

Note that the X-axial components Xfp and Xfr of the vectors FP and FR are acquired based on the component Xc in the relative positional coordinates (Xc, Yc, Zc) and known information relating to the X-axial direction.

The cylinders 8b and 11 are driven by the cargo handling control section 50 in such a way that the vectors FP and FR obtained in the above-described-manner become zero to thereby carry out automatic positioning of the forks 6. It is to be noted however that the movement of the forks 6 in the X-axial direction is done by the manual operation by the driver. Therefore, the cargo handling control section 50 need not treat the X-axial components Xfp and Xfr of the vectors FP and FR as control targets at the time of performing automatic positioning control.

After the automatic positioning, the driver allows the mast assembly 4 to perform a reach operation through a manual operation to do a load pickup work or a load deposition work. The reach operation of the mast assembly 4 may be automatically controlled.

When the forks 6 are moved closer to a cargo handling target while moving the forklift 1 forward during automatic positioning control, the forks 6 are automatically positioned to the cargo handling target even if the forks 6 are deviated from the cargo handling target.

The present embodiment has the following advantages in addition to the effects of the first embodiment.

The camera 19 for realizing automatic fork positioning control is secured to the middle beam 90 of the inner mast members 7c. It is therefore unnecessary to provide a mechanism, which lifts the camera 19 up and down, so that the structure is simple and the cost is reduced.

As the camera 19 need not be attached to the carriage 9, it is possible to prevent the camera 19 from interfering with objects around, such as a rack and a load, at the time of a cargo carrying work. Therefore, the housing that protects the camera 19 does not require a large strength, thus contributing to cost reduction.

If the camera 19 is mounted to the carriage 9, the impact applied to the camera 19 at the time of a cargo carrying work becomes greater. In the present embodiment, however, the camera 19 is mounted to the inner mast members 7c separate from the carriage 9, so that the impact applied to the camera 19 at the time of a cargo carrying work is suppressed.

Because the camera 19 is always positioned below the forks 6 at the time of positioning control, the forward field of view can be surely secured regardless of whether or not there is a load.

Because the camera 19 is mounted to the inner mast members 7c, the camera 19 does not interfere with the ground even when the forks 6 are moved to the lowermost position.

At the time of automatic positioning control, the control is carried out in consideration of the amount of movement of the forks 6 in the Y-axial direction with respect to the camera 19. Therefore, automatic positioning control is executed adequately as per the first embodiment in which the camera 19 is mounted to the carriage 9.

The embodiment of the present invention can be modified as follows.

In the second embodiment in FIG. 15 to FIG. 18, the tilt angle of the forks 6 may be manually adjusted at the time of automatic positioning control according to the load deposition mode. The forks 6 can be set with their angle tilted backward by operating the cross switch 37 at the time of automatic positioning control so that a load on the forks 6 does not easily fall off. As the camera 19 is not tilted together with the forks 6, permitting manual manipulation of the tilt angle of the forks 6 at the time of automatic positioning control does not affect the image processing. As long as automatic positioning control is not interfered, the tilt angle of the forks 6 may be made manually manipulatable at the time of automatic positioning control even in the first embodiment in FIG. 1 to FIG. 14(b).

In the second embodiment in FIG. 15 to FIG. 18, the tilt angle of the forks 6 may be held at a predetermined rearward tilt angle at the time of automatic positioning control according to the load deposition mode. That is, when the activation switch 38 is depressed and the load deposition mode is selected, the cargo handling control section 50 drives the tilt cylinder 12 to set the tilt angle of the forks 6 to the predetermined rearward tilt angle. At the time of automatic positioning control, therefore, it is possible to make a load on the forks 6 unlikely fall off. Even this setting does not cause a problem in automatic positioning control as discussed above. As long as automatic positioning control is not interfered, the tilt angle of the forks 6 may be held at a predetermined rearward tilt angle at the time of automatic positioning control even in the first embodiment in FIG. 1 to FIG. 14(b).

In the second embodiment in FIG. 15 to FIG. 18, a pair of right and left first lift cylinders 8a may be provided. Alternatively, a single first lift cylinder 8a may be arranged in a position shifted from the center between both inner mast members 7c and the camera 19 may be arranged at the center between both inner mast members 7c.

In the second embodiment in FIG. 15 to FIG. 18, the camera 19 may be fixed to a member other than the middle beam 90. For example, the camera 19 may be secured to one inner mast member 7c via an exclusive bracket. In short, the camera 19 has only to be secured directly or indirectly to the inner mast members 7c that support the carriage 9 in such a way as to be liftable up and down. Further, as long as the relative positional relationship between the forks 6 and the camera 19 can be grasped, the camera 19 may be attached to the inner mast members 7c via a moving mechanism.

In the second embodiment in FIG. 15 to FIG. 18, in case where automatic positioning control is carried out only at the time of a load pickup work, for example, the camera 19 may be placed at approximately the same level as the deposition surface of the forks 6 or a position slightly higher than that. If automatic positioning control is not carried out at the time of a load deposition work, it does not matter if a load on the forks 6 interferes with the field of view of image pickup of the camera 19.

In the second embodiment in FIG. 15 to FIG. 18, the camera 19 may be attached rotatably to the inner mast members 7c in such a way that its image pickup direction can be changed. For example, the camera 19 can be directed to the adequate image pickup direction according to the contents of a cargo carrying work by automatically changing the angle of the camera 19 by an actuator, such as a motor. The camera 19 may be attached to the inner mast members 7c in such a way as to be liftable up and down or movable horizontally by a moving mechanism. In case where the camera 19 is liftable up and down, the camera 19 is made movable to the lift-up position corresponding to the load pickup mode and the lift-down position corresponding to the load deposition mode as per the first embodiment in FIG. 1 to FIG. 14(b).

The reach operation of the mast assembly 4 may be automatically controlled too at the time of automatic positioning control. For a forklift whose forks 6 do not move horizontally (Y-axial direction), the positioning of the forks 6 may be automatically controlled only in the vertical direction (Z-axial direction). Automatic positioning control only in the Y-axial direction can be employed.

Automatic horizontal control of the forks 6 may be carried out only in load pickup mode. This reduces the possibility of load collapse originated from automatic horizontal control in load deposition mode.

The display device 25 need not necessarily be mounted on the forklift 1 and may be omitted. The layout position of the display device 25 is not limited to a position diagonally frontward above the driver's seat 15, as long as it is the position that can be seen from the driver's seat 15.

The lever for doing a driving operation and cargo handling operation is not limited to the multi lever 31, separate levers may be provided for each of the operations. That is, an accel lever, a lift lever, a reach lever, a tilt lever and a side shift lever may be provided individually. In this case, the activation switch 38 is provided on one of those levers.

The activation switch 38 that activates the lock-on system 61 is not necessarily essential; for example, a structure in which positioning control of the forks 6 is started when the image of the mark M1 (M2) is recognized by the camera 19 is possible. The activation switch 38 is not limited to a push-button type but may be, for example, a lever type. A release switch for releasing the activation of the lock-on system 61 may be provided in place of the activation switch 38.

The system of connection of the load pickup mode switch 62 and the load deposition mode switch 63 to the controller 48 may be either a cable type or a wireless type. Because the mode switches 62 and 63 are provided on the steering wheel knob 17 on the steering wheel 16, which is subjected to a turning operation, in the above-described embodiments, a wireless system is employed in consideration of interconnection.

The load pickup mode switch 62 and the load deposition mode switch 63 may not be needed and a structure of only automatically setting the mode may be feasible. On the contrary, only manual mode setting with the mode switches 62 and 63 may be used and the structure for automatic mode setting may be omitted.

The pattern matching method performed by the image recognition processing section 72 is not limited to the method explained in the above-described embodiments. For example, a template used in pattern matching may be selected from templates of plural sizes in accordance with the display size of the mark M1 (M2) to be displayed on the screen 25a. The shapes of the mark M1 (M2) and the template T1 (T2) may be changed as needed.

A method other than the pattern matching method explained in the above-described embodiments may be employed in image recognition. For example, a method of recognizing the shape of the pallet 27 itself or the shelf plate 29 itself as a cargo handling target based on image data acquired by the camera 19 and calculating the position of the cargo handling target may be employed.

A plurality of cameras may be mounted on the forklift 1. For example, cameras, which pick up images at the back of the vehicle and sides of the vehicle, may be provided in addition to the camera 19, which picks up an image in front of the vehicle. Alternatively, a camera for a load deposition work and a camera for a load pickup work may be provided separately. In this case, the camera for a load deposition work may be provided on the inner mast members 7c as in the second embodiment and the camera for a load pickup work may be provided on the carriage 9 as in the first embodiment. With regard to the camera for a load deposition work, the interference with objects around, such as a rack and a load, can be avoided and impact to be applied can be suppressed. With regard to the camera for a load pickup work, a problem does not arise if the field of view of image pickup is interfered with a load on the forks 6 at the time of a load deposition work, so that the camera lifting mechanism as in the first embodiment is unnecessary.

An ultrasonic sensor or a linear sensor may be used as the stroke sensor 129. A conversion mechanism for converting the linear movement of the piston rod 11a of the side shift cylinder 11 to the rotational motion may be provided so that a potentiometer, which detects the rotational amount in the conversion mechanism, can be used as the stroke sensor 129.

The range of the height of the forks 6 that allows automatic positioning control may be changed as needed. Even in case where the forks 6 are in a position lower than the upper limit height (2 meters) at which the forks 6 can move along the inner mast members 7c, automatic positioning control may be allowed. In this case, it is necessary to use, as the height sensor 54, a sensor that can continuously detect the height of the forks 6 to grasp the relative positional relationship between the forks 6 and the camera 19 in the second embodiment in FIG. 15 to FIG. 18.

The present invention may be adapted to a forklift equipped with an automatic fork lifting unit. For example, the automatic fork lifting unit automatically lifts the forks up to a height set by a predetermined setting unit. Then, automatic fork positioning control that has been explained in the above-described embodiments is started through a manual operation of the activation switch or automatically.

The present invention is not limited to the reach type forklift truck 1 but may be adapted to a counter balance type forklift. Instead of the forks 6, other types, such as a roll clamp, may be used as a cargo carrying apparatus. Further, the present invention may be adapted to industrial vehicles other than a forklift.

What is claimed is:

1. A position control apparatus for a cargo carrying apparatus on an industrial vehicle, comprising:

a camera for picking up an image of a mark provided on a cargo handling target to acquire data of the image;

image processing means for processing said image data and detecting a position of said mark;

target position determining means for determining a target position to which said cargo carrying apparatus is to be shifted based on said detected position of said mark;

deviation amount calculating means for computing a deviation amount of a current position of said cargo carrying apparatus with respect to said target position based on a result of processing said image data by said image processing means;

moving means for moving said cargo carrying apparatus; and control means for executing a positioning control to position said cargo carrying apparatus with respect to said target position and causing said moving means to move said cargo carrying apparatus in such a way as to eliminate said deviation amount.

2. The position control apparatus according to claim 1, further comprising operation means, which is operated to cause said control means to start said positioning control.

3. The position control apparatus according to claim 1, further comprising a display device for displaying the image picked up by said camera.

4. The position control apparatus according to claim 3, further comprising:

drawing means for drawing a target point in the image displayed on said display device; and target point calculating means for computing a position, based on said target position, in which said target point is to be drawn in such a way that said deviation amount is eliminated when a mark in said image displayed on said display device coincides with said target point.

5. The position control apparatus according to claim 1, further comprising memory means for storing a template to be used to identify a mark included in said image data, wherein said image processing means identifies the mark in the image data by matching said template with the mark in the image data.

6. The position control apparatus according to claim 5, wherein shapes of said mark and said template are determined in such a way that said template matches with the mark in said image data, irrespective of a distance between said cargo handling target and said camera.

7. The position control apparatus according to claim 1, further comprising a tilt actuator for tilting said cargo carrying apparatus, wherein said control means causes said tilt actuator to adjust a tilt angle of said cargo carrying apparatus prior to initiation of said positioning control in such a way that a load deposition surface of said cargo carrying apparatus becomes horizontal.

8. The position control apparatus according to claim 1, wherein based on the image data of said mark, said image processing means identifies a position and size of said mark in a predetermined image coordinate system, the image coordinate system being similar to a real coordinate system where said cargo handling target exists, and said deviation amount calculating means computes said deviation amount based on said identified position and size of said mark.

9. The position control apparatus according to claim 1, wherein based on the image data of said mark, said image processing means identifies a position and size of said mark in a predetermined image coordinate system, the image coordinate system being similar to a real coordinate system where said cargo handling target exists, and said deviation amount calculating means acquires a current position of the camera with respect to the mark in said real coordinate system based on said identified position and size of said mark and computes said deviation amount based on the acquired current position of the camera.

10. The position control apparatus according to claim 9, wherein said deviation amount computing means uses a relationship between the position of said camera and the position of said cargo carrying apparatus and a relationship between the position of said mark and said target position to compute said deviation amount.

11. The position control apparatus according to claim 1, further comprising selection means for selecting one of operation modes prepared for said positioning control, wherein said control means executes said positioning control in accordance with the operation mode selected by the selection means.

12. The position control apparatus according to claim 11, wherein said selection means is a manual operation member.

13. The position control apparatus according to claim 11, wherein said selection means automatically selects an operation mode in accordance with a load on said cargo carrying apparatus.

14. The position control apparatus according to claim 11, wherein said operation modes include a load pickup mode for picking up a load at a predetermined deposition place by means of said cargo carrying apparatus and a load deposition mode for depositing a load on the cargo carrying apparatus at said deposition place.

15. The position control apparatus according to claim 14, wherein said cargo handling target includes a pallet for deposition of a load and a rack on which said pallet is to be placed, said mark is one of a first mark affixed to the pallet and a second mark affixed to the rack, said image processing means detects a position of the first mark when said load pickup mode is selected, and said image processing means detects a position of the second mark when said load deposition mode is selected.

16. The position control apparatus according to claim 15, wherein said target position determining means sets the position of the first mark as said target position when said load pickup mode is selected, and said target position determining means sets a position above the second mark by a predetermined distance as said target position when said load deposition mode is selected.

17. The position control apparatus according to claim 14, wherein said control means positions said cargo carrying apparatus in a vertical direction and in a widthwise direction of the vehicle with respect to said target position when said load pickup mode is selected, and said control means positions said cargo carrying apparatus only in the vertical direction with respect to said target position when said load deposition mode is selected.

18. The position control apparatus according to claim 14, further comprising:
a carriage for supporting said cargo carrying apparatus, said camera being mounted on the carriage; and
a camera lifting actuator for lifting said camera up and down with respect to said carriage,
wherein said camera lifting actuator moves the camera to a level that is substantially the same as or above a lower end of said cargo carrying apparatus when said load pickup mode is selected, and said camera lifting actuator moves the camera below the lower end of said cargo carrying apparatus when said load deposition mode is selected.

19. The position control apparatus according to claim 1, further comprising:
a carriage having a side shifter movable in a widthwise direction of the vehicle, said cargo carrying apparatus being attached to the side shifter;
a side shift actuator for moving said side shifter; and
a lifting unit for lifting said carriage up and down,
wherein said moving means includes said side shift actuator and said lifting unit.

20. The position control apparatus according to claim 19, wherein said camera is mounted on said side shifter.

21. The position control apparatus according to claim 20, further comprising a camera lifting actuator for lifting said camera up and down with respect to said side shifter.

22. The position control apparatus according to claim 1, further comprising a lifting unit for supporting and lifting up and down said cargo carrying apparatus, wherein said control means inhibits execution of said positioning control when a height of said cargo carrying apparatus is lower than a predetermined threshold value.

23. The position control apparatus according to claim 1, further comprising a lifting unit for supporting and lifting up and down said cargo carrying apparatus, wherein said lifting unit has a guide member for guiding said cargo carrying apparatus to move up and down, said lifting unit lifting the cargo carrying apparatus up and down along the guide member when a height of said cargo carrying apparatus is lower than a predetermined threshold value, and said lifting unit lifting the guide member up and down while holding the position of the cargo carrying apparatus with respect to the guide member when the height of said cargo carrying apparatus is equal to or higher than said threshold value, wherein the camera is mounted on said guide member.

24. The position control apparatus according to claim 23, wherein said control means inhibits execution of said positioning control when the height of said cargo carrying apparatus is lower than said threshold value.

25. The position control apparatus according to claim 24, wherein a mounting position of the camera with respect to said guide member is determined in such a way that an image pickup range of said camera is not interference with the cargo carrying apparatus when the height of said cargo carrying apparatus is equal to or greater than said threshold value.

26. The position control apparatus according to claim 25, wherein said camera is positioned below said cargo carrying apparatus when the height of said cargo carrying apparatus is equal to or greater than said threshold value.

27. The position control apparatus according to claim 23, further comprising:
- a side shift actuator for moving said cargo carrying apparatus in a widthwise direction of the vehicle with respect to said guide member, said moving means including said side shift actuator and said lifting unit; and
- side shift detecting means for detecting an amount of shifting of said cargo carrying apparatus in the widthwise direction of the vehicle,
- wherein said deviation amount calculating means uses the amount of shifting of the cargo carrying apparatus in the widthwise direction of the vehicle to compute said deviation amount.

28. The position control apparatus according to claim 23, wherein said lifting unit includes a telescopic type mast comprised of a plurality of mast members, wherein the mast members include a guide mast member serving as said guide member, and said guide mast member is positioned at a topmost portion of said mast when the mast is protracted most.

29. The position control apparatus according to claim 28, wherein the height of the cargo carrying apparatus becomes said threshold value when said cargo carrying apparatus is positioned at a topmost end of said guide mast member and said mast is retracted most.

30. The position control apparatus according to claim 28, wherein said lifting unit further includes a first actuator for lifting said cargo carrying apparatus up and down along said guide mast member and a second actuator for protracting and retracting said mast, said first actuator is driven when the height of the cargo carrying apparatus is lower than said threshold value, and said second actuator is driven when the height of the cargo carrying apparatus is equal to or greater than said threshold value.

31. The position control apparatus according to claim 30, further comprising:
- a side shift actuator for moving said cargo carrying apparatus in a widthwise direction of the vehicle with respect to said guide mast member, said moving means including said side shift actuator and said second actuator; and
- side shift detecting means for detecting an amount of shifting of said cargo carrying apparatus in the widthwise direction of the vehicle,
- wherein said deviation amount computing means uses the amount of shifting of the cargo carrying apparatus in the widthwise direction of the vehicle to compute said deviation amount.

32. The position control apparatus according to claim 28, wherein said guide mast member is one of a pair of guide mast members, said cargo carrying apparatus is liftable up and down between both guide mast members, and said camera is mounted on a horizontal beam for coupling both guide mast members.

33. The position control apparatus according to claim 1, wherein said target position determining means determines the target position so that the position of said mark and said target position have a predetermined relationship.

34. A position control method for a cargo carrying apparatus on an industrial vehicle, comprising:
- picking up an image of a mark provided on a cargo handling target with a camera to acquire data of the image;
- processing said image data and detecting a position of said mark;
- determining a target position to which said cargo carrying apparatus is to be shifted based on said detected position of said mark;
- computing a deviation amount of a current position of said cargo carrying apparatus with respect to said target position based on a result of processing said image data; and
- moving said cargo carrying apparatus in such a way as to eliminate said deviation amount.

35. The position control method according to claim 34, wherein the target position is determined so that the position of said mark and said target position have a predetermined relationship.

* * * * *

UNITED STATES PATENT AND TRADEMARK OFFICE
CERTIFICATE OF CORRECTION

PATENT NO. : 7,010,404 B2 Page 1 of 1
APPLICATION NO. : 10/470129
DATED : March 7, 2006
INVENTOR(S) : Hisashi Ichijo et al.

It is certified that error appears in the above-identified patent and that said Letters Patent is hereby corrected as shown below:

In the Specification

Column 10, line 39, please delete "whit-e-and" and insert therefore --white and--;
column 12, line 10, please delete "angle a" and insert therefore --angle α--;
column 17, line 38, please delete "FP vector OP" and insert therefore --FP=vector OP--.

Signed and Sealed this

Seventeenth Day of April, 2007

JON W. DUDAS
*Director of the United States Patent and Trademark Office*